US011525589B2

(12) United States Patent
Son et al.

(10) Patent No.: US 11,525,589 B2
(45) Date of Patent: Dec. 13, 2022

(54) AIR CLEANER

(71) Applicant: LG Electronics Inc., Seoul (KR)

(72) Inventors: Sanghyuk Son, Seoul (KR); Seokho Choi, Seoul (KR); Jaehyuk Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 304 days.

(21) Appl. No.: 16/689,822

(22) Filed: Nov. 20, 2019

(65) Prior Publication Data

US 2020/0158357 A1    May 21, 2020

(30) Foreign Application Priority Data

Nov. 20, 2018  (KR) .......................... 10-2018-0143414

(51) Int. Cl.
| | | |
|---|---|---|
| *B01D 46/00* | (2022.01) | |
| *B01D 46/64* | (2022.01) | |
| *F04D 29/54* | (2006.01) | |
| *F24F 8/10* | (2021.01) | |
| *F04D 25/06* | (2006.01) | |
| *F24F 8/108* | (2021.01) | |

(52) U.S. Cl.
CPC ............ *F24F 8/10* (2021.01); *B01D 46/0049* (2013.01); *B01D 46/64* (2022.01); *F04D 25/0606* (2013.01); *F04D 29/547* (2013.01); *B01D 2279/50* (2013.01); *F24F 8/108* (2021.01)

(58) Field of Classification Search
CPC .. B01D 46/00; B01D 46/002; B01D 46/0008; B01D 46/0047; B01D 46/24; F24F 11/30; F04D 25/08; F04D 27/00; F04D 29/38; F04D 29/52; F04D 29/54; F04D 29/58
USPC ........................................ 55/471–473, 385.1
See application file for complete search history.

(56) References Cited

U.S. PATENT DOCUMENTS

| | | | | |
|---|---|---|---|---|
| 10,436,469 | B2 * | 10/2019 | Mun | F24F 8/10 |
| 2016/0290348 | A1 * | 10/2016 | Mornan | F04D 25/082 |
| 2017/0246570 | A1 * | 8/2017 | Park | B01D 46/2411 |
| 2017/0246576 | A1 * | 8/2017 | Jung | B01D 46/0045 |
| 2017/0246577 | A1 * | 8/2017 | Jung | B01D 46/24 |
| 2017/0246579 | A1 * | 8/2017 | Mun | B01D 46/0005 |
| 2017/0246580 | A1 * | 8/2017 | Bae | F24F 1/0071 |
| 2017/0246581 | A1 * | 8/2017 | Jung | F24F 8/10 |
| 2017/0248153 | A1 * | 8/2017 | Park | F04D 29/703 |
| 2018/0001248 | A1 * | 1/2018 | Jung | B01D 46/0005 |
| 2021/0162327 | A1 * | 6/2021 | Yang | B01D 46/24 |
| 2022/0008855 | A1 * | 1/2022 | Yang | B01D 46/0049 |

* cited by examiner

*Primary Examiner* — Minh Chau T Pham
(74) *Attorney, Agent, or Firm* — Fish & Richardson P.C.

(57) ABSTRACT

An air cleaner includes a fan that is configured to suck air in an axial direction and discharge air between the axial direction and a radial direction. The air cleaner further includes a fan motor that is configured to rotate the fan. The air cleaner further includes an air guide unit that includes a cylindrical outer wall and an inner wall that is located in a center portion of the outer wall and that defines a space that is configured to receive the fan motor. The air guide unit defines an annular air flow path that is configured to receive air discharged by the fan and that is defined by an inner circumferential surface of the outer wall and an outer circumferential surface of the inner wall. The air guide unit further includes a plurality of guide ribs. The air guide unit further includes a plurality of flow guide protrusions.

11 Claims, 28 Drawing Sheets

AIR CLEANER

CROSS-REFERENCE TO RELATED APPLICATION

This application claims the benefit of Korean Application No. 10-2018-0143414, filed on Nov. 20, 2018, which is incorporated by reference.

FIELD

This specification relates to an air cleaner, and more particularly, to an air cleaner to which a mixed flow fan is applied.

BACKGROUND

An air cleaner is an apparatus that sucks, purifies, and discharges air, and changes the room into a comfortable environment by filtering and discharging fine dust and odors from the sucked air.

The air cleaner includes a blowing fan for flowing air. The blowing fan is classified into an axial flow fan, a centrifugal fan, and a mixed flow fan according to the air flow direction.

The axial flow fan is formed in a structure of sucking air in the rotational shaft direction (hereinafter, the axial direction) of a fan motor and discharging the sucked air in the axial direction.

The centrifugal fan is formed in a structure of sucking air in the axial direction and discharging the sucked air in the circumferential direction.

The mixed flow fan is formed in a structure of sucking air in the axial direction and discharging the sucked air between in the axial direction and in the radial direction.

Since the mixed flow fan is formed to have a smaller width in the axial direction, when the mixed flow fan is applied to the air cleaner, an internal space in the axial direction of the air cleaner may be secured.

SUMMARY

In some air cleaners with fans, a plurality of guide ribs are disposed circumferentially spaced on the blowing flow path located downstream of the blowing fan in the air flow direction. Further, thanks to the internal space in the axial direction that is secured as the blowing fan is formed as the mixed flow fan, the axial length of the plurality of guide ribs could be formed long.

However, since this air cleaner has a long length in the axial direction of the plurality of guide ribs, it is possible to maximize the amount of air discharged to the outside, but there is a problem that noise is increased.

This disclosure describes an air cleaner in which the noise is reduced while maximizing the air volume.

This disclosure describes an air cleaner for guiding the air flowing between the axial direction and the radial direction in the blowing fan upward.

According to an innovative aspect of the subject matter described in this disclosure, an air cleaner includes a fan that is configured to suck air in an axial direction and discharge air between the axial direction and a radial direction; a fan motor that is configured to rotate the fan; and an air guide unit that includes (i) a cylindrical outer wall and (ii) an inner wall that is located in a center portion of the outer wall and that defines a space that is configured to receive the fan motor; defines an annular air flow path that is configured to receive air discharged by the fan and that is defined by an inner circumferential surface of the outer wall and an outer circumferential surface of the inner wall; includes a plurality of guide ribs that are spaced apart from each other in a circumferential direction, that are located in the annular air flow path, that each have a curved plate shape that includes a positive pressure surface that pushes air and is concave and a negative pressure surface that is opposite the positive pressure surface and that is convex, and that each include a cutoff portion that connects a lower end of a respective guide rib to a side of the respective guide rib close to the outer wall; and includes a plurality of flow guide protrusions that are spaced apart from each other in the radial direction and that are located on the negative pressure surface, where each cutoff portion defines a cut-off hole that joins the cutoff portion and the inner circumferential surface of the outer wall in a rotation direction.

This implementation and other implementations may include one or more of the following optional features. Each of the plurality of flow guide protrusions has a protruded height from the negative pressure surface that decreases from a lower end of the flow guide protrusion to an upper end of the flow guide protrusion. Each of the plurality of guide ribs has an upper end and a lower end that are oriented in the rotation direction of the fan as the upper end and the lower end progress in the radial direction. The cutoff portion is inclined closer to the outer wall as it progresses from a lower end to an upper end. The cutoff portion includes a vertical portion that extends vertically from a lower end; and a horizontal portion that extends in the radial direction from an upper end of the vertical portion to one side of the guide rib close to the outer wall.

Each of the plurality of guide ribs includes a plurality of teeth that are located in an upper end of a respective guide rib and that are spaced apart from each other in the radial direction. Each of the plurality of teeth has an upper end that is convex, and has a width in the radial direction that becomes wider as it progresses from the upper end to a lower end. Each of the plurality of guide ribs includes a bending portion that is located at a lower end of a respective guide rib and that is bent toward the negative pressure surface. Each of the plurality of guide ribs connects the inner circumferential surface of the outer wall and the outer circumferential surface of the inner wall.

The fan includes a hub that is coupled to a rotation shaft of the fan motor and that extends with a radius that increases in a direction of air flow through the annular air flow path; a shroud that is spaced apart from the hub, that extends in a direction in which the hub extends, and that includes a central portion that defines a suction port that is configured to suck air; and a plurality of blades that are located between the hub and the shroud. The air cleaner includes a fan housing that is configured to receive the fan. The outer wall is located above the fan housing. A lower portion of the inner wall is located in an opened upper side of the hub.

In the air cleaner describe below, a plurality of flow guide protrusions are formed in the negative pressure surface of each of the plurality of guide ribs to be vertically spaced apart from each other in the radial direction, thereby maximizing the air volume moving upwards.

In addition, a cutoff portion is formed in one side of each of the plurality of guide ribs, and the cutoff portion forms a cutoff hole communicating in the rotation direction of the fan between the cutoff portion and the inner circumferential surface of the outer wall, thereby reducing noise caused by wind.

BRIEF DESCRIPTION OF THE DRAWINGS

Like reference numbers and designations in the various drawings indicate like elements.

DETAILED DESCRIPTION

Figure 1:
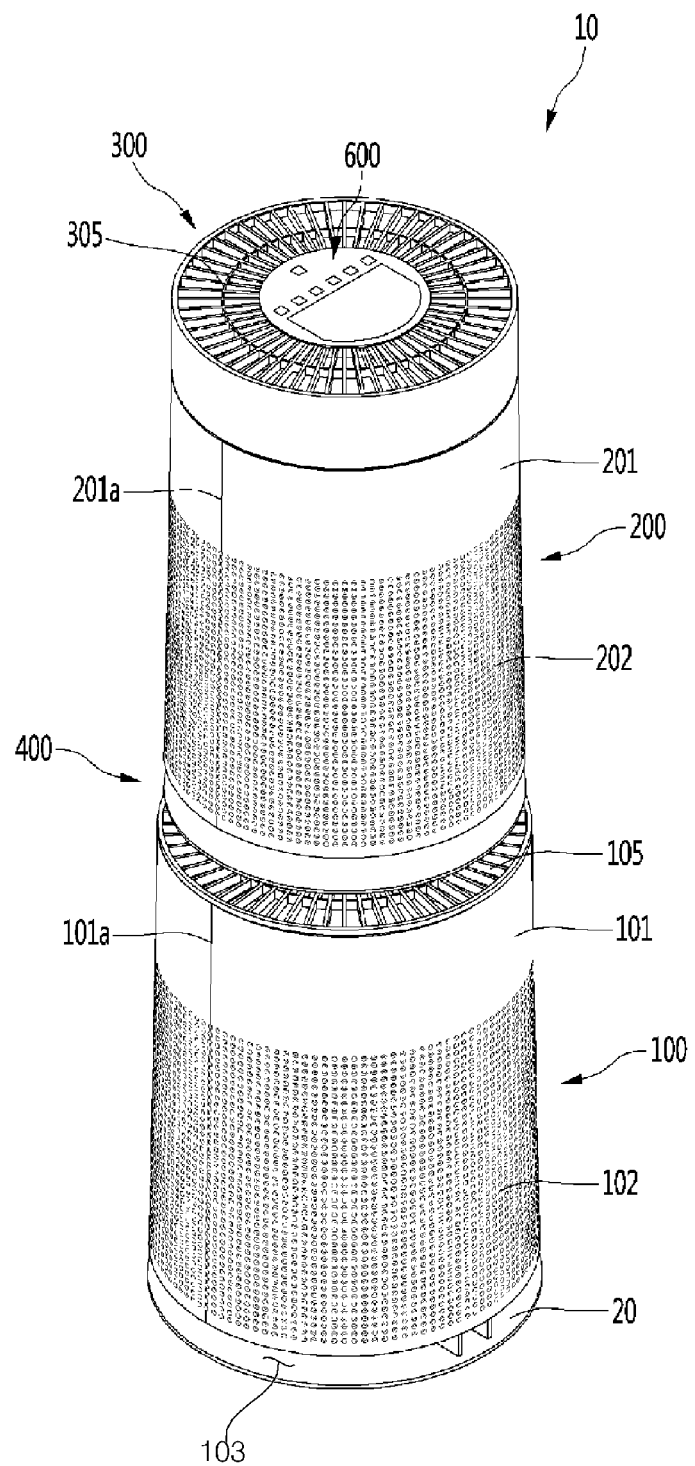
FIG. 1 is a perspective view of an outer shape of an example air cleaner.

FIG. 1 is a perspective view showing an outer shape of an air cleaner.

Referring to FIG. 1, an air cleaner 10 includes a blowing unit 100, 200 for generating air flow and a flow diversion unit 300 for diverting the discharge direction of the air flow generated in the blowing unit 100, 200.

The blowing unit 100, 200 includes a first blowing unit 100 for generating a first air flow and a second blowing unit 200 for generating a second air flow.

The first blowing unit 100 and the second blowing unit 200 may be disposed in the vertical direction. For example, the second blowing unit 200 may be disposed above the first blowing unit 100. In this case, the first air flow forms a flow for sucking indoor air existing in the lower side of the air cleaner 10, and the second air flow forms a flow for sucking indoor air existing in the upper side of the air cleaner 10

The air cleaner 10 includes a case 101, 201 that forms an outer shape.

In detail, the case 101, 201 includes a first case 101 forming an outer shape of the first blowing unit 100. The first case 101 may have a cylindrical shape. In addition, an upper portion of the first case 101 may be configured to have a smaller diameter than the lower portion. That is, the first case 101 may have a conical shape with a truncated end portion.

The first case 101 includes a first separation part 101a in which two parts constituting the first case 101 are combined or separated. The first case 101 further includes a hinge part provided in the opposite side of the first separation part 101a. The two parts may relatively rotate with respect to the hinge part.

When at least one of the two parts rotates, the first case 101 is opened and may be separated from the air cleaner 10. A locking unit may be provided in a portion to which the two parts are coupled, that is, in an opposite side of the hinge part. The locking unit may include a locking protrusion or a magnet member. The first case 101 may be opened to replace or repair internal parts of the first blowing unit 100.

The first case 101 is provided with a first suction part 102 through which air is sucked. The first suction part 102 includes a through hole formed through at least a portion of the first case 101. The first suction part 102 is formed in plural number.

The plurality of first suction parts 102 are formed evenly in the circumferential direction along the outer circumferential surface of the first case 101 to enable air suction in any direction with respect to the first case 101. That is, the air may be sucked in the 360 degree direction, based on a center line of the vertical direction passing through the inner center of the first case 101.

As described above, since the first case 101 is formed in a cylindrical shape and a plurality of first suction parts 102 are formed along the outer circumferential surface of the first case 101, the suction amount of air may increase. In addition, there is an effect that the flow resistance to the sucked air may be reduced by avoiding a hexahedral shape having a corner portion like the case of a conventional air cleaner.

The air sucked through the first suction part 102 may flow in a substantially radial direction from the outer circumferential surface of the first case 101. The directions are defined as follows. Based on FIG. 1, the vertical direction is referred to as an axial direction, and the horizontal direction is referred to as a radial direction. The axial direction may correspond to a central shaft direction of a first fan 160 and a second fan 260 described later, that is, a motor shaft direction of the fan. Further, the radial direction may be understood as a vertical direction in the axial direction.

Further, the circumferential direction is understood as a virtual circular direction formed when it rotates on the axial direction while the radial distance is a radius of rotation The first blowing unit 100 further includes a base 20 that is provided below the first case 101 and placed on the ground. The base 20 is spaced downward from the lower end of the first case 101. In addition, an annular base suction part 103 is formed in a space between the first case 101 and the base 20.

The air sucked through the base suction part 103 may flow upward through a suction port 112 of a suction grill 110 (see FIG. 2) provided above the base 20.

That is, the first blowing unit 100 includes a plurality of suction parts 102 and 103. Air existing in the lower side of the indoor space may be introduced into the first blowing unit 100 through the plurality of suction parts 102 and 103. Thus, the suction amount of air may be increased.

A first discharge part 105 is formed above the first blowing unit 100. The first discharge part 105 may be formed in a first discharge grill 195 of a first discharge guide unit 190 (see FIG. 2) provided in the first blowing unit 100. The first discharge guide unit 190 forms an outer shape of the upper end of the first blowing unit 100. The air discharged through the first discharge part 105 may flow upward in the axial direction.

The case 101, 201 includes the second case 201 forming an outer shape of the second blowing unit 200. The second case 201 may have a cylindrical shape. In addition, an upper portion of the second case 201 may be configured to have a smaller diameter than the lower portion. That is, the second case 201 may have a conical shape having a truncated end portion.

The second case 201 includes two parts that may be separated or combined through a second separation part 201a and a hinge part. The second case 201 may be configured to be openable similarly to the first case 101. Detailed description is replaced by the description regarding the first case 101. The second case 201 may be opened to replace or repair internal parts of the second blowing unit 200.

The lower end diameter of the second case 201 may be smaller than the upper end diameter of the first case 101. Therefore, in view of the overall shape of the case 101, 201, the lower cross-sectional area of the case 101, 201 is formed larger than the upper cross-sectional area. Accordingly, the air cleaner 10 may be stably supported on the ground.

The second case 201 is provided with a second suction part 202 through which air is sucked. The second suction part 202 includes a through hole formed through at least a portion of the second case 201. The second suction part 202 is formed in plural number.

The plurality of second suction parts 202 are formed evenly in the circumferential direction along the outer circumferential surface of the second case 201 to enable air suction in any direction with respect to the second case 201. That is, the air may be sucked in the 360 degree direction, based on a center line of the vertical direction passing through the inner center of the second case 201.

As described above, since the second case 201 is formed in a cylindrical shape and a plurality of second suction parts 202 are formed along the outer circumferential surface of the second case 201, the suction amount of air may increase. In addition, there is an effect that the flow resistance to the sucked air may be reduced by avoiding a hexahedral shape having a corner portion like the case of a conventional air cleaner.

The air sucked through the second suction part 202 may flow in a substantially radial direction from the outer circumferential surface of the second case 201.

The air cleaner 10 includes a partition unit 400 provided between the first blowing unit 100 and the second blowing unit 200. Due to the partition unit 400, the second blowing unit 200 may be positioned spaced apart toward the upper side of the first blowing unit 100. Descriptions related to the partition unit 400 will be described later with reference to the drawings.

The flow diversion unit 300 may be installed above the second blowing unit 200. Based on the air flow, the air flow path of the second blowing unit 200 may be in communication with the air flow path of the flow diversion unit 300. The air passed through the second blowing unit 200 may be discharged to the outside through a second discharge part 305, via the air flow path of the flow diversion unit 300. The second discharge part 305 is formed in an upper end of the flow diversion unit 300.

Figure 19:
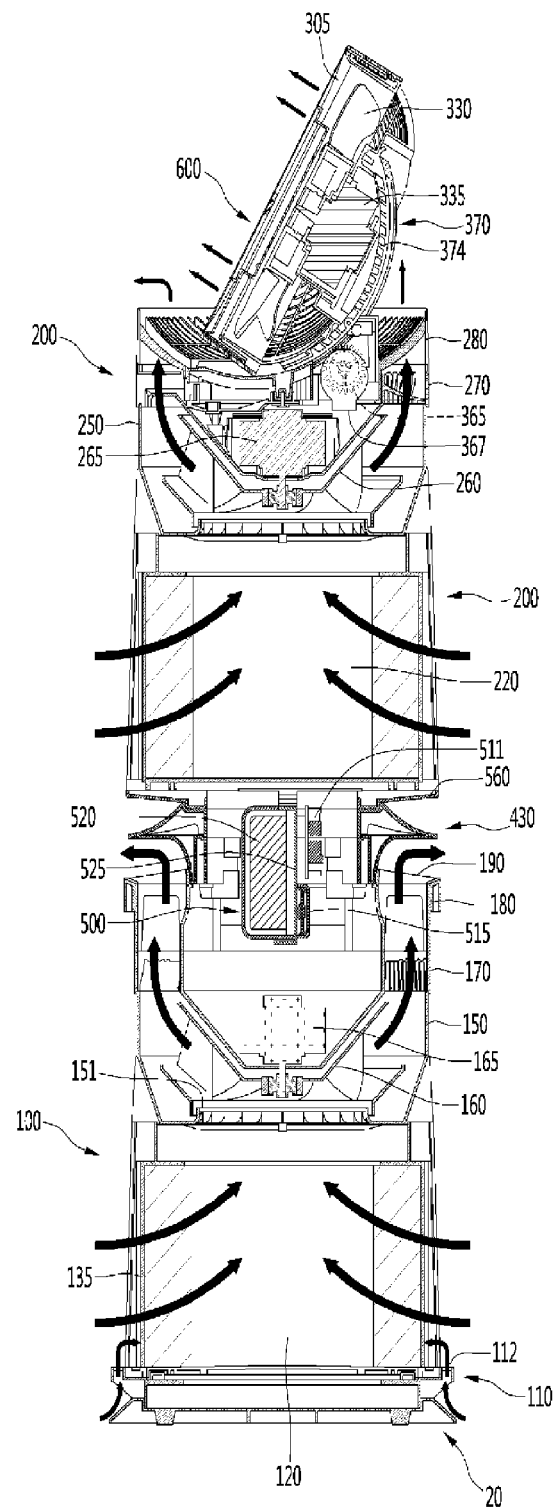

The flow diversion unit 300 may be provided to be movable. In detail, the flow diversion unit 300 may be in a lying state (first position), as shown in FIG. 1, or in an inclined state (second position), as shown in FIG. 19.

In addition, a display unit 600 that displays operation information of the air cleaner 10 is provided in the upper side of the flow diversion unit 300. The display unit 600 may move together with the flow diversion unit 300.

Figure 2:
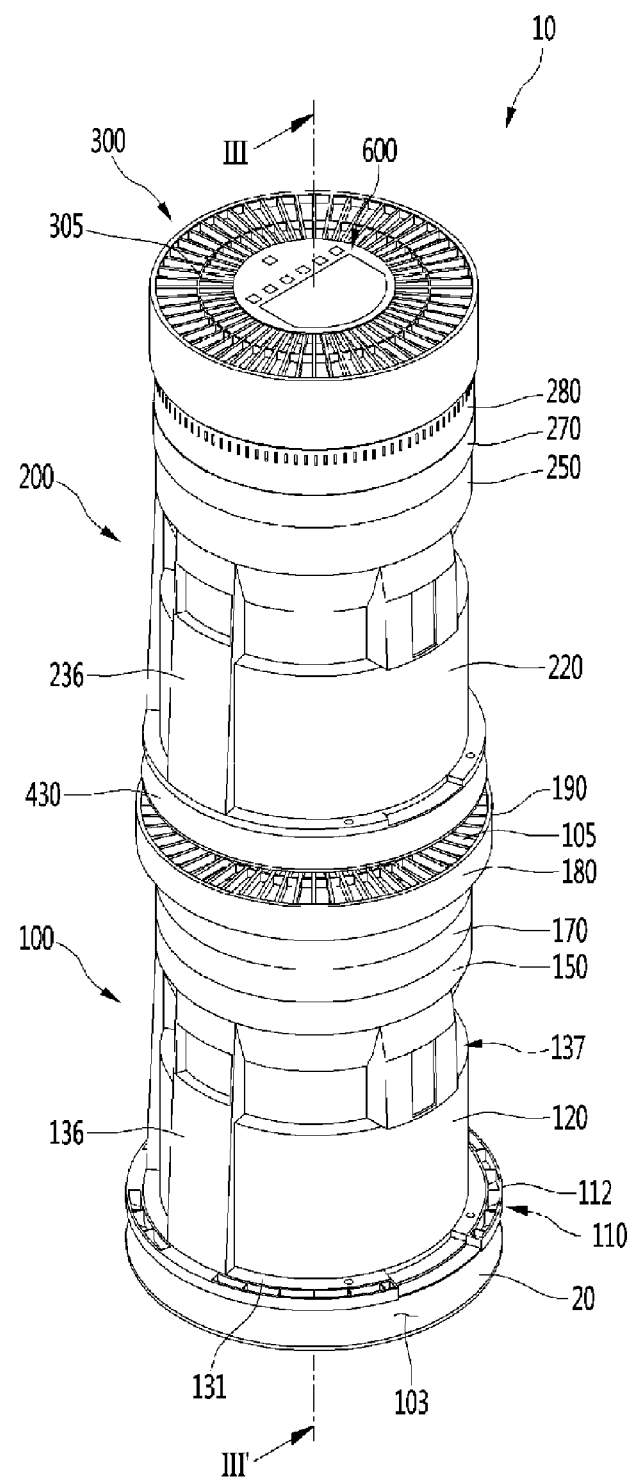
FIG. 2 is a perspective view of an internal configuration of an example air cleaner.
Figure 3:
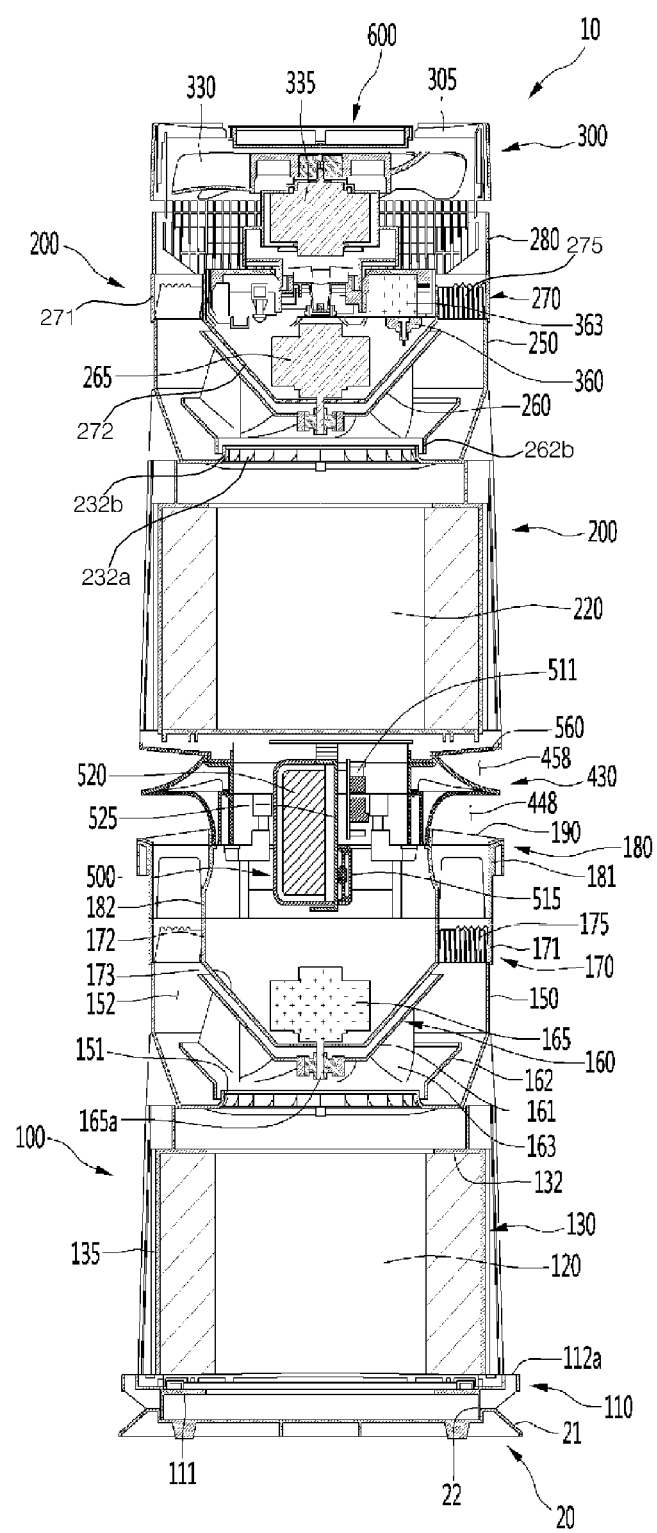
FIG. 3 is a cross-sectional view taken along line III-III' of FIG. 2.

FIG. 2 is a perspective view showing an internal configuration of an air cleaner, and FIG. 3 is a cross-sectional view taken along line of FIG. 2.

Referring to FIGS. 2 and 3, the first blowing unit 100 includes a base 20 and a suction grill 110 disposed above the base 20.

The base 20 includes a base body 21 placed on the ground and a base protrusion 22 which protrudes upward from the base body 21 and on which the suction grill 110 is placed. The base protrusion 22 may be provided in both sides of the base 20.

Due to the base protrusion 22, the base body 21 and the suction grill 110 are spaced apart from each other. A base suction part 103 is formed between the base 20 and the suction grill 110 to form an air suction space.

The suction grill 110 includes a substantially ring-shaped grill body 111 and an edge portion protruding upward from an outer circumferential surface of the grill body 111. Due to the configuration of the grill body 111 and the edge portion, the suction grill 110 may have a stepped configuration.

The suction grill 110 includes a suction part 112 formed in the edge portion. The suction part 112 is configured to protrude upward along the circumference of the edge portion, and may be configured to extend in the circumferential direction. In addition, a plurality of suction holes 112a are formed inside the suction part 112. The plurality of suction holes 112a may be in communication with the base suction part 103.

The air sucked through the plurality of suction holes 112a and the base suction part 103 may pass through a first filter member 120. The first filter member 120 may have a cylindrical shape and have a filter surface for filtering air. The air passed through the plurality of suction holes 112a may penetrate through the outer circumferential surface of the cylindrical first filter member 120 and be introduced therein.

The first blowing unit 100 further includes a first filter frame 130 forming a mounting space of the first filter member 120. In detail, the first filter frame 130 includes a first frame 131 forming a lower portion of the first filter frame 130 and a second frame 132 forming an upper portion of the first filter frame 130. The first and second frames 131 and 132 may have a substantially ring shape.

The first filter frame 130 further includes a first filter support part 135 extended upward from the first frame 131 toward the second frame 132. A plurality of first filter support parts 135 may be provided, and the plurality of first filter support parts 135 may be disposed in a circumferential direction and connected to edge portion of the first and second frames 131 and 132.

The mounting space of the first filter member 120 is defined by the first and second frames 131 and 132 and the plurality of first filter support parts 135. A first support part cover 136 may be coupled to the outside of the first filter support part 135.

A sensor unit 137 may be installed in the first filter frame 130. The sensor unit 137 may include a dust sensor for detecting the amount of dust in the air and a gas sensor for detecting the amount of gas in the air. The dust sensor and the gas sensor may be disposed to be supported by the second frame 132 of the first filter frame 130.

In the mounting space, the first filter member 120 may be detachably mounted. The first filter member 120 may have a cylindrical shape, and air may be introduced through an outer circumferential surface of the first filter member 120. In the process of passing through the first filter member 120, impurities such as fine dust in the air may be filtered out.

Since the first filter member 120 has a cylindrical shape, air may be introduced in any direction, based on the first filter member 120. Thus, the filtering area of the air may be increased.

The mounting space may be provided in a cylindrical shape in correspondence with the shape of the first filter member 120. The first filter member 120 may be slidably pulled in toward the mounting space, during the mounting process. On the other hand, the first filter member 120 may be slidably pulled out from the mounting space during a separation process.

The first blowing unit 100 further includes a first fan housing 150 installed in the outlet side of the first filter member 120. The first fan housing 150 is provided with a housing space part 152 in which the first fan 160 is accommodated. In addition, the first fan housing 150 may be supported by the first filter frame 130.

A lower part of the first fan housing 150 includes a first fan inlet 151 for guiding the inflow of air into the first fan housing 150. The first fan inlet 151 may be provided with a grill to prevent a user from inserting a finger or the like into the first fan housing 150, when the first filter member 150 is separated.

The first blowing unit 100 further includes an ionizer for removing or sterilizing odor particles in the air. The ionizer may be coupled to the first fan housing 150 and act on the air flowing through the inside of the first fan housing 150.

The sensor unit 137 and the ionizer may be installed in the second blowing unit 200 described later. As another example, the sensor unit 137 and the ionizer may be installed in one of the first blowing unit 100 and the second blowing unit 200.

The first fan 160 is disposed above the first fan inlet 151. For example, the first fan 160 includes a centrifugal fan that introduces air in the axial direction and discharges the air upward in the radial direction.

In detail, the first fan 160 includes a hub 161 to which a rotation shaft 165a of a first fan motor 165, which is a centrifugal fan motor, is coupled, a shroud 162 disposed spaced apart from the hub 161, and a plurality of blades 163 disposed between the hub 161 and the shroud 162. The first fan motor 165 may be coupled to the upper side of the first fan 160.

The hub 161 may have a bowl shape whose diameter becomes narrower as it progresses downward. The hub 161 includes a shaft coupling portion to which the rotation shaft 165a is coupled and a first blade coupling portion obliquely extended upward from the shaft coupling portion.

The shroud 162 may include a lower end portion having a shroud suction port through which the air passed through the first fan inlet 151 is sucked and a second blade coupling portion extended upward from the lower end portion.

One surface of the blade 163 may be coupled to the first blade coupling portion of the hub 161, and the other surface may be coupled to the second blade coupling portion of the shroud 162. The plurality of blades 163 may be disposed spaced apart in the circumferential direction of the hub 161.

The first blowing unit 100 further includes a first air guide unit 170 which is coupled to the upper side of the first fan 160 and guides the flow of air passed through the first fan 160.

The first air guide unit 170 includes an outer wall 171 having a cylindrical shape and an inner wall 172 positioned inside the outer wall 171 and having a cylindrical shape. The outer wall 171 is disposed to surround the inner wall 172. An annular first air flow path through which air flows is formed between the inner circumferential surface of the outer wall 171 and the outer circumferential surface of the inner wall 172.

The first air guide unit 170 includes a guide rib 175 disposed in the first air flow path. The guide rib 175 is extended from the outer circumferential surface of the inner wall 172 to the inner circumferential surface of the outer wall 171. A plurality of guide ribs 175 may be disposed spaced apart from each other. The plurality of guide ribs 175 serve to guide the air introduced into the first air flow path of the first air guide unit 170 via the first fan 160 upward.

The guide rib 175 may be obliquely extended upward from the lower portion of the outer wall 171 and the inner wall 172. For example, the guide rib 175 is formed to be round, and guides the air to obliquely flow upward.

The first air guide unit 170 further includes a motor accommodating part 173 extended downward from the inner wall 172 to accommodate the first fan motor 165. The motor accommodating part 173 may have a shape of a bowl whose diameter decreases toward the lower side. The shape of the motor accommodating part 173 may correspond to the shape of the hub 161. The motor accommodating part 173 may be inserted into the hub 161.

The first fan motor 165 may be supported by the upper side of the motor accommodating part 173. In addition, the rotation shaft 165a of the first fan motor 165 may be extended downwardly from the first fan motor 165, and pass through the bottom surface of the motor accommodating part 173 to be coupled to the shaft coupling part of the hub 161.

The first blowing unit 100 further includes a second air guide unit 180 which is coupled to the upper side of the first air guide unit 170, and guides the air passed through the first air guide unit 170 to the first discharge guide unit 190.

The second air guide unit 180 may include a first guide wall 181 having a substantially cylindrical shape, and a second guide wall positioned inside the first guide wall 181 and having a substantially cylindrical shape 182. The first guide wall 181 may be disposed to surround the second guide wall 182.

A second air flow path through which air flows is formed between the inner circumferential surface of the first guide wall 181 and the outer circumferential surface of the second guide wall 182. The air flowing through the first air flow path of the first air guide unit 170 passes through the second air flow path and flows upward. The second air flow path 185 may be referred to as a "discharge flow path". The first discharge part 105 is disposed above the second air flow path.

Inside the second guide wall 182 having a cylindrical shape, a first space portion in which at least a portion of a PCB unit 500 is accommodated is formed. The PCB unit includes a power supply unit 520 and a main PCB 511.

The power supply unit 520 is understood as a device that receives commercial power supplied from a power line connected to the air cleaner 10, and supplies power to a plurality of components in the main PCB 511 and the air cleaner 10. The power supply unit 520 may include an AC power PCB (power PCB).

The main PCB 511 may include a DC power PCB driven by a DC voltage converted from the AC power PCB.

The PCB unit 500 further includes a PCB support plate 525 for supporting the power supply unit 520 and the main PCB 511. The main PCB 511 may be supported by one surface of the PCB support plate 525, and the power supply 520 may be supported by the other surface of the PCB support plate 525.

The PCB unit includes a communication module 515 which allows the air cleaner 10 to communicate with an external device. For example, the communication module 515 may include a Wi-Fi module. The communication module 515 may be supported by the PCB support plate 525 and disposed below the main PCB 511.

The first blowing unit 100 further includes a first discharge guide unit 190 which is disposed in the upper side of the second air guide unit 180, that is, in the outlet side of the air flow passing through the second air guide unit 180, based on the air flow path, and guides the discharge of air to the outside of the air cleaner 10. In the first discharge guide unit 190, a first discharge part 105 through which air is discharged is formed.

The second blowing unit 200 includes a second filter member 220, a support unit 240 for supporting the lower portion of the second filter member 220, and a lever unit 242 which is provided below the support unit 240 and supports the second filter member 220 and the support unit 240 (see FIG. 4).

The second blowing unit further includes a lever support unit 560 for supporting the lever unit 242. The lever support unit 560 has a substantially annular shape. The lever support unit 560 includes a third space portion defining an installation space in which the PCB unit 500 may be located. The third space portion is formed in an approximately center portion of the lever support unit 560.

The partition unit 400 is provided between the first blowing unit 100 and the second blowing unit 200. The partition unit 400 includes a partition plate 430 for separating or blocking the air flow generated in the first blowing unit 100 and the air flow generated in the second blowing unit 200. The first and second blowing units 100 and 200 may be disposed spaced apart in the vertical direction by the partition plate 430.

That is, the separation space in which the partition plate 430 is located is formed between the first and second blowing units 100 and 200. The first discharge guide unit 190 of the first blowing unit 100 is located in the lower end of the separation space, and the lever support unit 560 of the second blowing unit 200 is located in the upper end of the separation space.

The separation space may be partitioned into an upper space and a lower space by the partition plate 430. The lower space is understood as a first space portion 448 through which air discharged from the first discharge part 105 of the first discharge guide unit 190 flows to the outside of the air cleaner 10. The upper space constitutes a second space portion 458 as a gripping space into which a user can put his hand when moving the air cleaner 10.

Air discharged from the first discharge part 105 may be guided by the partition plate 430 to flow to the outside of the air cleaner 10, and may be prevented from flowing into the second blowing unit 200.

Figure 4:
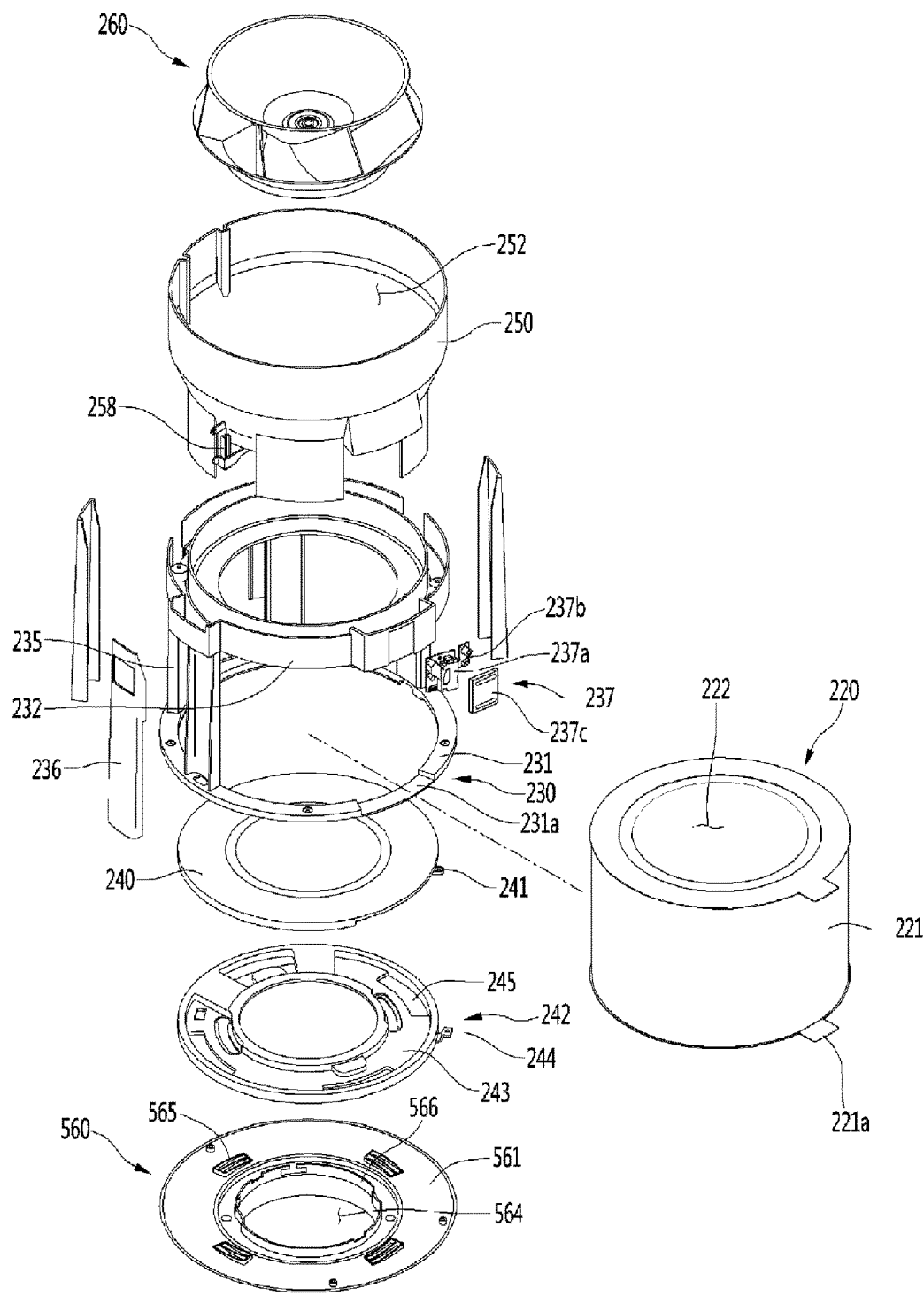
FIG. 4 is an exploded perspective view of an example second blowing unit.

FIG. 4 is an exploded perspective view showing a configuration of a second blowing unit.

Referring to FIG. 4, the second blowing unit 200 includes a lever support unit 560, a lever unit 242, a support unit 240, a second filter member 220, a second filter frame 230, a second fan housing 250, and a second fan 260.

The second filter member 220 may have a cylindrical shape with an upper portion opened. The second filter member 220 includes a filter body 221 having a hollow cylindrical filter part, and a filter hole 222 formed by being opened at an upper end of the filter body 221. A filter gripping part 221a is provided in the upper and lower portions of the filter body 221. Air may be introduced into the filter body 221 through the outer circumferential surface of the filter body 221 and may be discharged from the second filter member 220 through the filter hole 222. The configuration of the second filter member 220 may be used in the first filter member 120 as well.

The lever support unit 560 includes a lever support body 561 having an annular shape. The lever supporting body 561 is extended slightly inclined upward with respect to the axial direction from the inner circumferential surface toward the outer circumferential surface. That is, the surface constituting the lever support body 561 constitutes an inclined surface. The space between the inclined surface and the upper surface of the partition plate 430 provides a second space portion 458 in which the user's hand can be located.

Meanwhile, the lever support body 561 may be called a "block part", in that it blocks the air discharged through the first discharge part 105 of the first blowing unit 100 from flowing into the second blowing unit 200.

The lever support unit 560 further includes a movement guide part 565 protruding upward from the lever support body 561. A plurality of movement guide parts 565 may be spaced apart in the circumferential direction of the lever support body 561. The lever support unit 560 further includes a support jaw 566 protruding upward from the inner circumferential surface of the lever support body 561. The support jaw 566 supports the lever unit of the second blowing unit 200.

The lever unit 242 may be provided to enable a user's operation. For example, the lever unit 242 may be provided to be rotatable in the circumferential direction.

The lever unit 242 includes a lever body 243 that has a substantially ring shape and is rotatably provided. The lever body 243 has a plurality of cutouts 145 disposed in positions corresponding to the plurality of movement guide parts 565. The plurality of cutouts 145 may be understood as through holes formed in the lever body 243.

The plurality of cutout parts 245 are spaced apart from each other and disposed in the circumferential direction of the lever body 243. The cutout parts 245 may be rounded to have a certain curvature in the circumferential direction, in correspondence with the curvature of the outer circumferential surface of the lever body 243.

The lever unit 142 is supported by the upper surface of the lever support body 561. When the lever unit 242 is supported by the lever support body 561, the plurality of movement guide parts 565 may be disposed to be inserted into the plurality of cutout parts 245. In detail, the plurality of movement guide parts 565 may protrude above the plurality of cutout parts 245 through the plurality of cutout parts 245.

The length of each cutout part 245 may be longer than the length of the movement guide part 565. Therefore, the lever unit 242 may be rotated while the movement guide part 565 is inserted into the cutout part 245. In addition, one end of the movement guide part 565 may interfere with one end of the cutout part 245 in the process of rotating the lever unit 242 in one direction, and the other end of the movement guide part 565 may interfere with the other end of the cutout part 245 in the process of rotating the lever unit 242 in the other direction.

A second handle 244 is provided in the outer circumferential surface of the lever body 243.

In the upper side of the lever unit 242, a support unit 240 for supporting the second filter member 220 is provided. The support unit 240 includes a first handle 241 coupled to the second handle 244. The user may grip the first and second handles 241 and 244 to rotate the lever body 143 and the support unit 140 in a clockwise or counterclockwise direction.

The lever unit 242 supports the lower surface of the support unit 240. The support unit 240 may be provided with a support protrusion part in contact with the movement guide part 565. The support protrusion part may protrude downward from the lower surface of the support unit 240 and may be provided in a position corresponding to the movement guide part 565. In addition, the shape of the support protrusion part corresponds to the shape of the movement guide part 565, and includes an inclined surface formed to gradually protrude in the circumferential direction.

The direction in which the movement guide part 565 is formed to gradually protrude and the direction in which the support protrusion part is gradually protruded may be opposite to each other. For example, if the direction in which the movement guide part 565 is configured to gradually protrude is a counterclockwise direction, the direction in which the support protrusion part is gradually protruded may be a clockwise direction.

The support protrusion part may be disposed in a position corresponding to the cutout part 245. That is, the movement guide part 565 and the support protrusion part may be disposed in a position of inserting into the cutout part 145.

The lever unit 242 and the support unit 240 may be rotated together. In this rotation process, the movement guide part 565 and the support protrusion part may interfere with each other. In detail, when the lower portion of the support protrusion part is in contact with the upper portion of the movement guide part 565, the lever unit 242 and the support unit 240 are lifted upward. In addition, the first filter member 220 supported by the support unit 240 is in a state of being coupled to the first blowing unit 200 while moving upward.

On the other hand, when the upper portion of the support protrusion part is in contact with the lower portion of the movement guide part 565 or when the interference between the support protrusion part and the movement guide part 565 is released, the lever unit 242 and the support unit 240 are descended downward. In addition, the first filter member 220 supported by the support unit 240 remains in a state of being detachable (release state) from the first blowing unit 100.

The second blowing unit 200 further includes a second filter frame 230 forming a mounting space of the second filter member 220. In detail, the second filter frame 230 includes a first frame 231 forming the lower portion of the first filter frame 231 and a second frame 232 forming the upper portion of the second filter frame 232.

The first frame 231 includes a frame recess part 231a having a shape recessed downward. The frame recess part 231a may be configured to recess at least a portion of the first frame 231. A groove 114 provides a space part in which the first and second handles 241 and 244 can move. The first and second handles 241 and 244 may be located in the space part and rotated in a clockwise or counterclockwise direction.

The second frame 232 is located to be spaced apart upward from the first frame 231. The second frame 232 has an approximately ring shape. The ring-shaped inner space of the second frame 232 forms at least a portion of the air flow path passing through the second filter frame 230. In addition, the upper portion of the second frame 232 may support the second fan housing 250.

The second filter frame 230 further includes a second filter support part 235 extended upward from the first frame 231 toward the second frame 232. The first and second frames 231 and 232 may be spaced apart from each other by the second filter support part 235. A plurality of second filter support parts 235 may be provided, and the plurality of second filter support parts 235 may be arranged in the circumferential direction and connected to the edge portion of the first and second frames 231 and 232.

The mounting space of the second filter member 220 is defined by the first and second frames 231 and 232 and the plurality of second filter support parts 235. In addition, a first support part cover 236 may be coupled to the outside of the second filter support part 235.

A second sensor frame 237 may be installed in the second filter frame 230. The sensor unit 237 may include a dust sensor 237a for detecting the amount of dust in the air and a gas sensor 237b for detecting the amount of gas in the air. The dust sensor 237a and the gas sensor 237b may be disposed to be supported by the second frame 232 of the second filter frame 230. The description of the configuration of the second sensor unit 237 may also be applied to the first sensor unit 137.

In the mounting space, the second filter member 220 may be detachably mounted. The first filter member 220 may have a cylindrical shape, and air may be introduced through an outer circumferential surface of the second filter member 220. In the process of passing through the second filter member 220, impurities such as fine dust in the air may be filtered out.

Since the first filter member 220 has a cylindrical shape, air may be introduced in any direction, based on the first filter member 220. Thus, the filtering area of the air may be increased.

The mounting space may be provided in a cylindrical shape in correspondence with the shape of the first filter member 220. The first filter member 220 may be slidably put in toward the mounting space during a mounting process. On the other hand, the second filter member 220 may be slidably put out from the mounting space during a separation process.

In other words, when the first and second handles 241 and 244 are operated while the first filter member 220 is placed on the upper surface of the support unit 240, the second filter member 220 moves downward, and is located in a release position. In addition, the second filter member 220 may slide outward in the radial direction, and may be separated from the mounting space.

On the other hand, in a state in which the second filter member 220 is separated from the mounting space, the second filter member 220 may slide inward in the radial direction toward the mounting space and be supported by the upper surface of the support unit 240, and may be in close contact upwardly by the operation of the first and second handles 241 and 244. At this time, the first filter member 220 is located in a coupling position to the first blowing unit 200.

The second blowing unit 200 further includes a second fan housing 250 installed in the outlet side of the second filter member 220. The second fan housing 250 is provided with a housing space part 252 in which the second fan 260 is accommodated. Since the configuration of the second fan housing 250 and the second fan 260 is the same as the configuration of the first fan housing 150 and the first fan 160, the description of the second fan housing 250 and the second fan 260 is replaced by the description of the first fan housing 150 and the first fan 160.

The second blowing unit 200 further includes an ionizer 258 for removing or sterilizing odor particles in the air. The ionizer 258 may be coupled to the first fan housing 250 and may act on the air flowing through the inside of the second fan housing 250. The ionizer 258 may have the same configuration as the ionizer of the first blowing unit 100.

Figure 5:
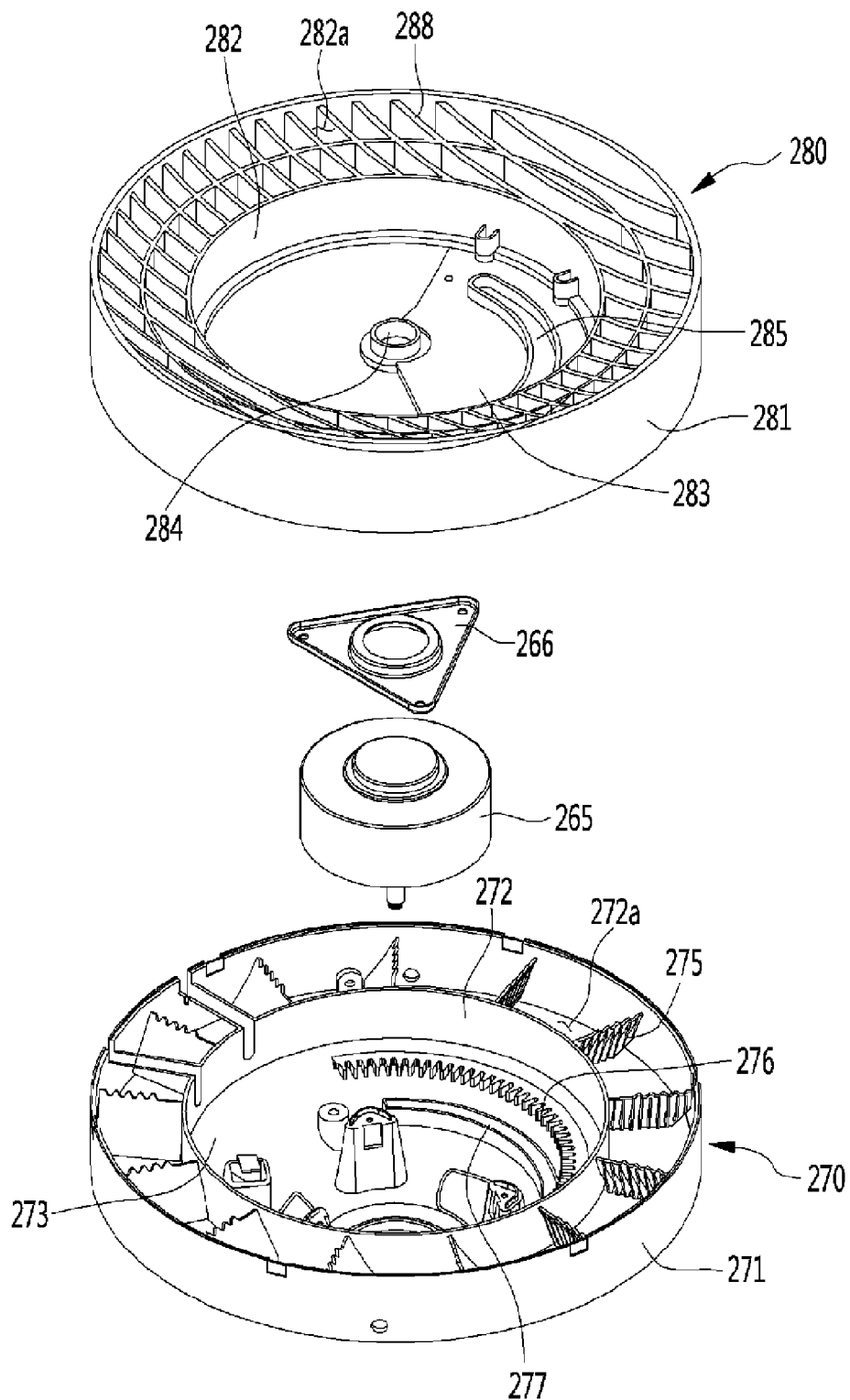
FIG. 5 is an exploded perspective view of an example third air guide unit and an example second discharge guide unit.
Figure 6:
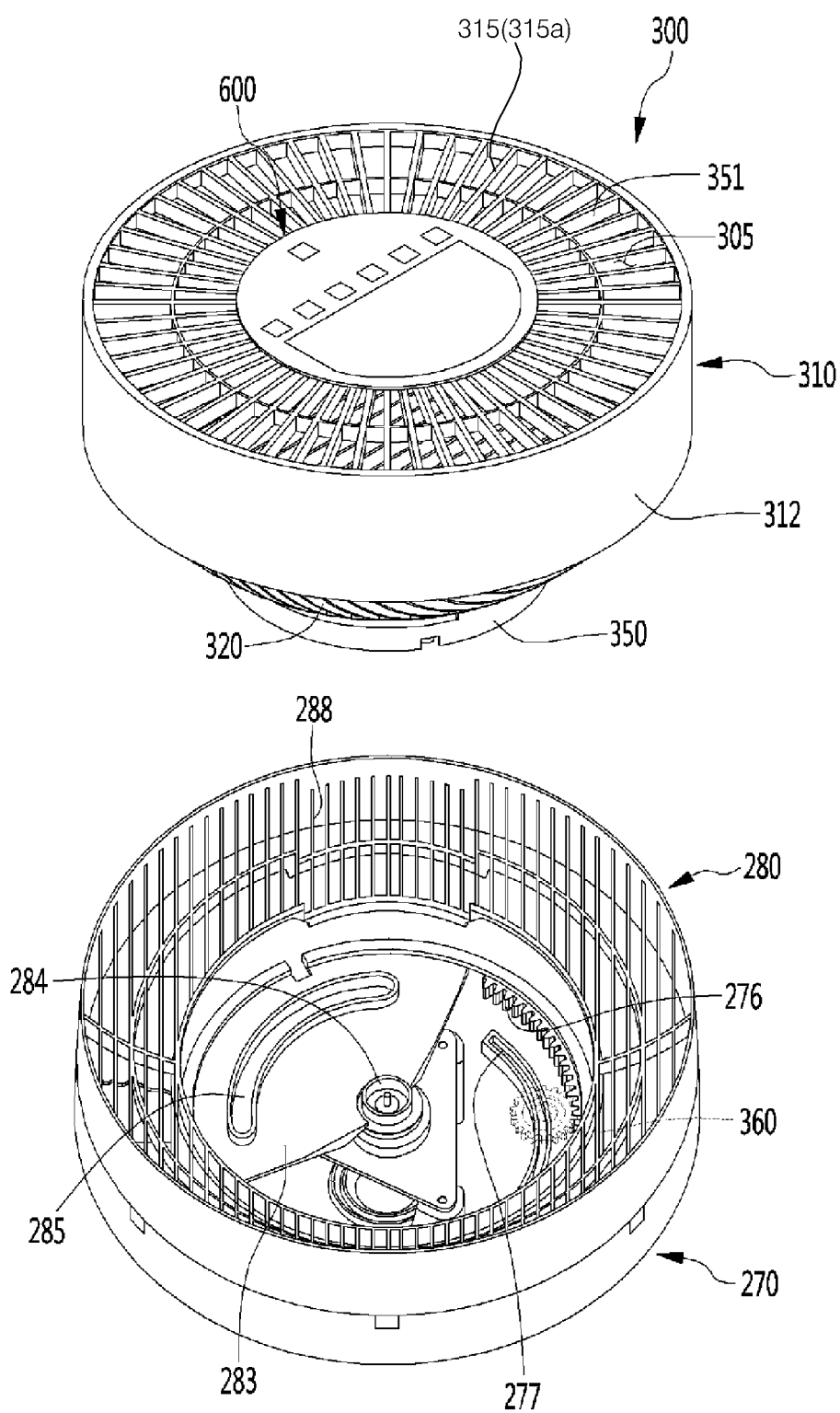
FIG. 6 is an exploded perspective view of an example flow diversion unit and a component to which the example flow diversion unit is coupled.
Figure 7:
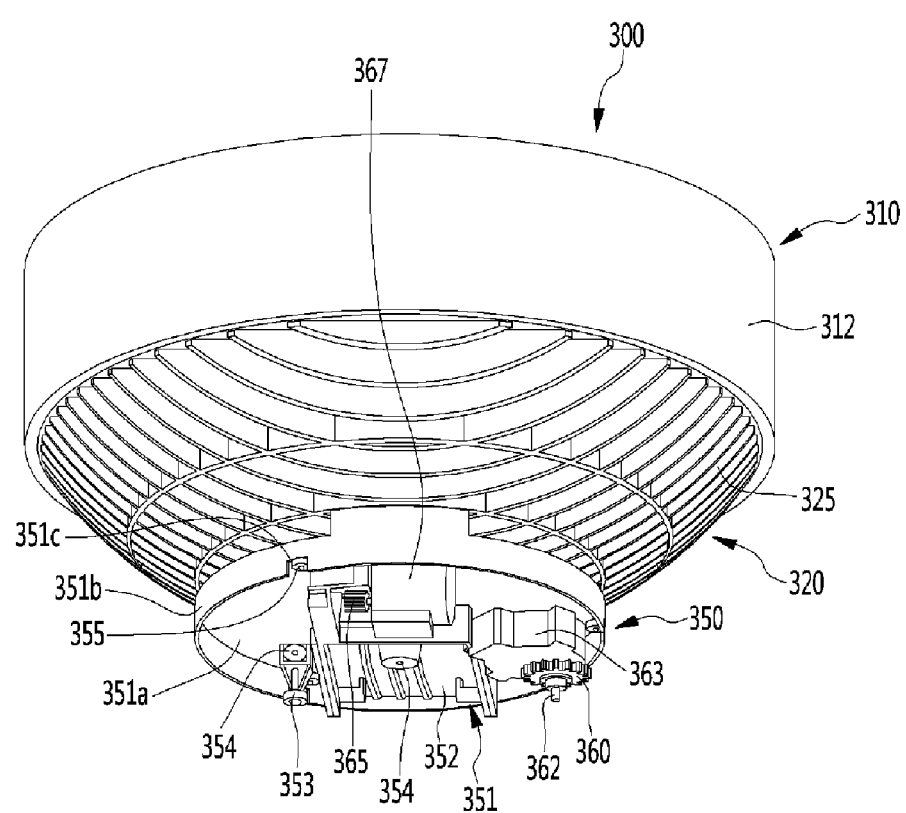
FIG. 7 is a perspective view of an example flow diversion unit.
Figure 8:
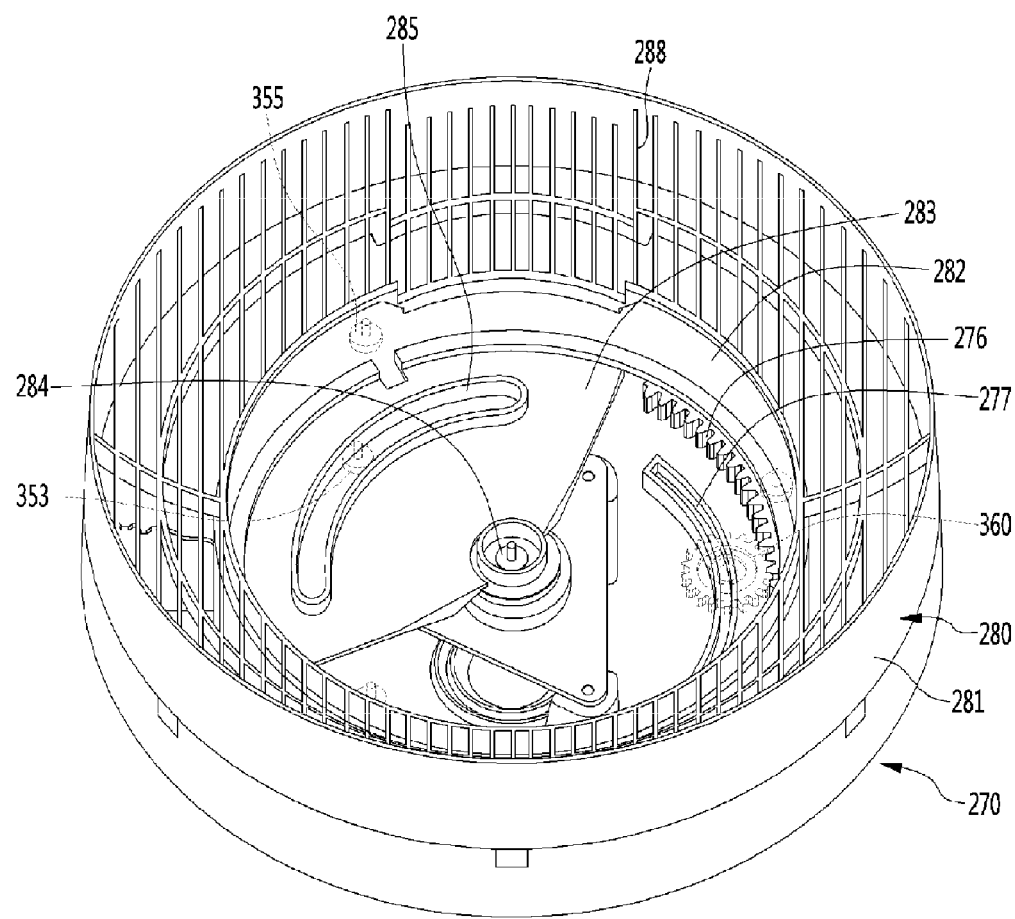
FIG. 8 is a view showing a combination of an example third air guide unit and an example second discharge guide unit.
Figure 9:
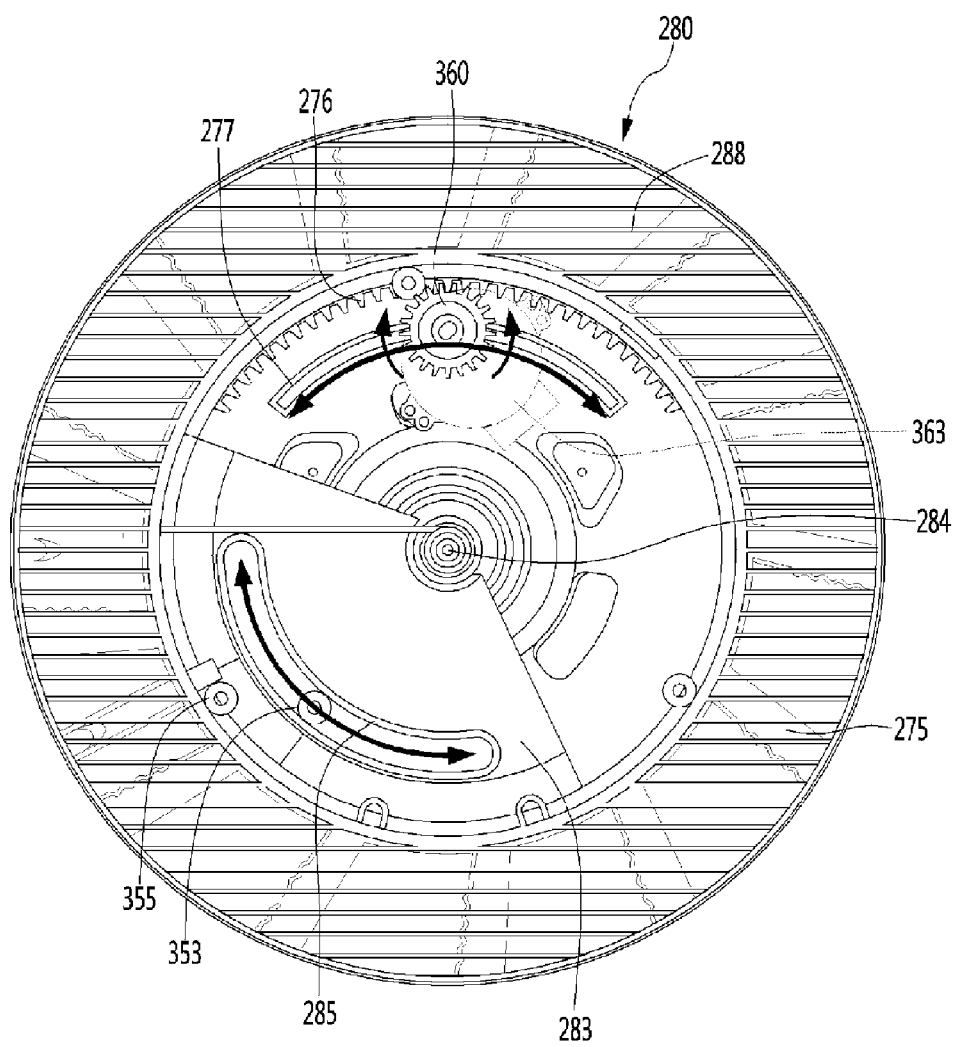
FIG. 9 is a view showing a state in which an example first guide mechanism operates to rotate an example flow diversion unit in the left and right direction.
Figure 10:
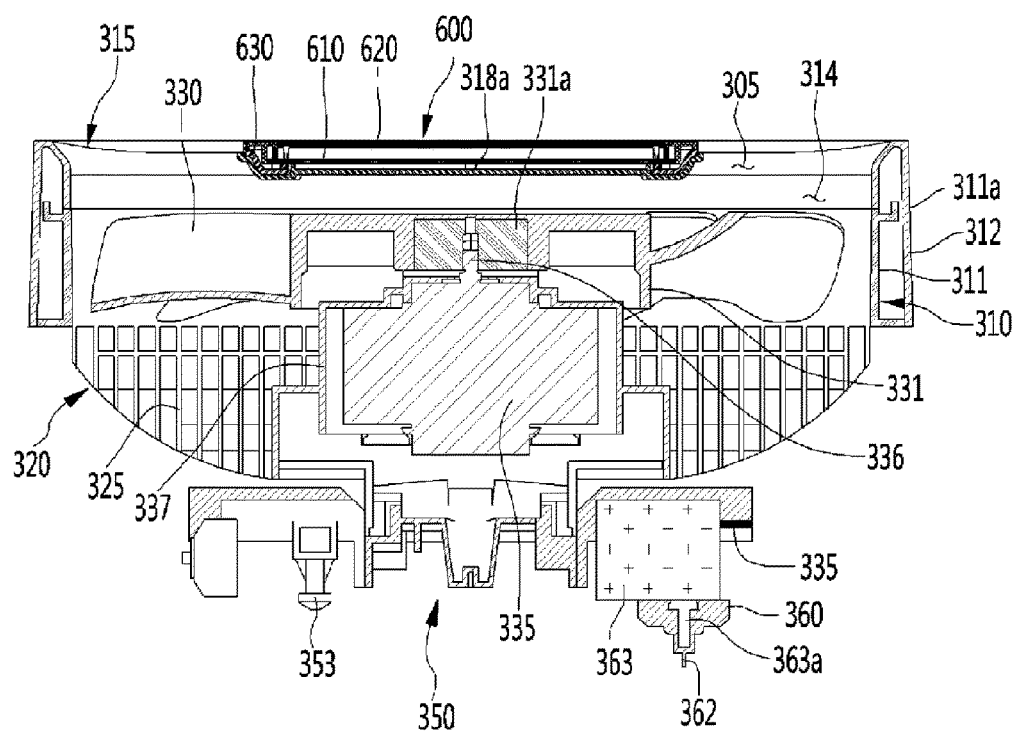
FIG. 10 is a cross-sectional view of an example flow diversion unit.

FIG. 5 is an exploded perspective view showing a configuration of a third air guide unit and a second discharge guide unit, FIG. 6 is an exploded perspective view showing a configuration of a flow diversion unit and a component to which the flow diversion unit is coupled, FIG. 7 is a perspective view showing a configuration of a flow diversion unit, FIG. 8 is a view showing a combination of a third air guide unit and a second discharge guide unit, FIG. 9 is a view showing a state in which a first guide mechanism operates to rotate a flow diversion unit in the left and right direction, and FIG. 10 is a cross-sectional view showing a configuration of a flow diversion unit.

Referring to FIGS. 5 to 10, the second blowing unit 220 further includes a third air guide unit 270 which is coupled to the upper side of the second fan 260 and guides the flow of air passed through the second fan 260.

The third air guide unit 270 may include an outer wall 271 forming an outer circumferential surface of the third air guide unit 270, and an inner wall 272 located inside the outer wall 271 and forming an inner circumferential surface of the third air guide unit 270. An annular first air flow path 272a through which air flows is formed between the inner circumferential surface of the outer wall 271 and the outer circumferential surface of the inner wall 272.

The third air guide unit 270 includes a guide rib 275 disposed in the first air flow path 272a. The guide rib 275 is extended from the outer circumferential surface of the inner wall 272 to the inner circumferential surface of the outer wall 271.

The third air guide unit 270 further includes a motor accommodating part 273 which is extended downward from the inner wall 272 and accommodates the second fan motor 265. The motor accommodating part 273 may have a bowl shape whose diameter decreases toward the lower side.

The second fan motor 265 is coupled to the upper side of the second fan 260 and provides a driving force to the second fan 260. The second fan motor 265 rotates the second fan 260. In addition, a motor coupling part 266 is provided in one side of the second fan motor 265, and the motor coupling part 266 guides the second fan motor 265 to fix to the third air guide unit 270.

The third air guide unit 270 includes a guide unit 276, 277 for guiding the movement of the flow diversion unit 300. The guide unit 276, 277 includes a first rack 276 and a shaft guide groove 277 provided in the motor accommodating part 273.

The first rack 276 is understood as a configuration for guiding the left and right rotation of the flow diversion unit 300 in conjunction with the first gear 360 of the flow diversion unit 300. The first rack 276 is provided in the inner circumferential surface of the motor accommodating part 273, and may be extended in the circumferential direction according to a set curvature. In addition, the length of the first rack 276 may be formed to have a length set based on a distance interlocked with the first gear 360.

The flow diversion unit 300 may be rotated in the left and right direction. Here, the rotation in the "left and right direction" may mean the rotation in the clockwise or counterclockwise direction based on the vertical direction. In this process, the first gear 360 may rotate with a certain radius of rotation about a rotation shaft 354 of the flow diversion unit 300.

The shaft guide groove 277 is a groove for guiding the rotation of the first gear 360 and understood as a configuration extended round with a certain curvature. For example, the shaft guide groove 277 may be formed to be rounded in the circumferential direction. That is, the shaft guide groove 277 may have a circular arc shape.

A first gear shaft 362 of the first gear 360 may be inserted into the shaft guide groove 277. In the process of rotating the first gear 360, the first gear shaft 362 may be moved along the shaft guide groove 277.

The second blowing unit 200 includes a second discharge guide unit 280 which is installed above the third air guide unit 270 and guides the flow of air passed through the third air guide unit 270.

The second discharge guide unit 280 may have a substantially annular shape. In detail, the second discharge guide unit 280 includes a discharge outer wall 281 forming an outer circumferential surface of the second discharge guide unit 280 and having a cylindrical shape, and a discharge inner wall 282, which is located inside the discharge outer wall 281, that forms an inner circumferential surface of the second discharge guide unit 280 and has a cylindrical shape.

The discharge outer wall 281 is disposed to surround the discharge inner wall 282. A second air flow path 282a, e.g., a discharge flow path through which the flow of the air passed through the third air guide unit 270 through which air flows is achieved is formed between the inner circumferential surface of the discharge outer wall 281 and the outer circumferential surface of the discharge inner wall 282. The discharge flow path may be located above the first air flow path 272a provided with the guide rib 275.

The second discharge guide unit 280 further includes a second discharge grill 288 disposed in the discharge flow path 282a. The second discharge grill 288 is extended from the outer circumferential surface of the discharge inner wall 282 to the inner circumferential surface of the discharge outer wall 281. The second discharge grill 288 may prevent a user from inserting a finger to the lower side of the discharge flow path 282a.

The second discharge guide unit 280 further includes a rotation guide plate 283 coupled to the discharge inner wall 282. The rotation guide plate 283 may be extended from the inner circumferential surface of the discharge inner wall 282 toward the inner center of the second discharge guide unit 280.

The rotation guide plate 283 includes a shaft insertion part 284 to provide a rotation center of a left and right direction of the flow diversion unit 300. The rotation shaft 354 may be inserted into the shaft insertion part 284. The shaft insertion part 284 may be located in the inner center of the second discharge guide unit 280. The rotation guide plate 283 may be understood as a support plate for supporting the shaft insertion portion 284.

The rotation guide plate 283 further includes a bearing groove 285. A first bearing 353 provided in the flow diversion unit 300 may be inserted into the bearing groove 285. The bearing groove 285 is a groove for guiding the movement of the first bearing 353 and understood as a configuration extended round with a set curvature. For example, the bearing groove 285 may be formed to be rounded in the circumferential direction. That is, the bearing groove 285 may have a circular arc shape.

In the left and right rotation process of the flow diversion unit 300, the first bearing 353 is inserted into the bearing groove 285 and may be moved. Accordingly, the frictional force generated during the rotation of the flow diversion unit 300 can be reduced.

The flow diversion unit 300 includes a third fan housing 310 in which a third fan 330 is accommodated. The third fan housing 310 has a substantially annular shape. In detail, the third fan housing 310 includes a housing cover 312 forming an outer shape.

Inside the housing cover 312, a housing body 311 having an annular shape is provided. That is, the housing cover 312 may be coupled to the outer circumferential surface of the housing body 311 and supported by the housing body 311.

For convenience of description, the first fan 160 and the second fan 260 may be referred to as a "main fan" and the third fan 330 may be referred to as a "sub fan". In other words, the first and second fans 160 and 260 may be referred to as a "blowing fan," and the third fan 330 may be referred to as a "flow diversion fan".

The housing body 311 includes a cover support part 311a that protrudes from the outer circumferential surface of the housing body 311 and supports the inside of the housing cover 312. The cover support part 311a may have a bent shape, and the outer surface of the cover support part 311a may be coupled to the inner surface of the housing cover 312.

The housing cover 312 is disposed to surround the housing body 311, and the housing body 311 and the housing cover 312 may be rotated or moved together. The third fan 330 is accommodated inside the housing body 311. In addition, a housing flow path 314 through which air flows due to driving of the third fan 330 is formed in the inner space of the housing body 311. A blade 333 of the third fan 330 may be located in the housing flow path 314. Due to the rotation of the blade 333, air may flow upward through the housing flow path 314. The housing flow path 314 may be extended to an upper space of the blade 333 from a space in which the blade 333 is located.

In the upper side of the third fan housing 310, a discharge grill 315 for forming a second discharge part 305 through which air passed through the third fan 330 is discharged is formed. The discharge grill 315 includes a grill outer wall, a grill inner wall provided inside the grill outer wall, and a plurality of grill parts 315a extended from the grill outer wall to the grill inner wall. Each of the grill outer wall and the grill inner wall may have a cylindrical shape, and the grill outer wall may be disposed to surround the grill inner wall.

Spaces between the plurality of grill parts 315a form the second discharge part 305.

Since the air cleaner 10 includes the second discharge part 305 together with the first discharge part 105 of the first blowing unit 100, the discharge air volume is improved and air is discharged in various directions.

The second discharge part 305 may be formed above the housing flow path 314. Therefore, the air passed through the housing flow path 314 may be discharged to the outside of the air cleaner 10 via the second discharge part 305 of the discharge grill 315.

The discharge grill 315 has a recess shape in an approximately center portion of the discharge grill 315, and further includes a recess portion supporting the display unit 600. The recess portion may be provided in a lower end of the grill inner wall.

The recess portion is provided with a support rib for supporting the display PCB 610 of the display unit 600. The support rib may protrude upward from the upper surface of the recess portion. The grille inner wall may support the lower side of the display PCB 610.

The display unit 600 includes a display PCB 610 having an illumination source, a reflector 620 coupled to the upper side of the display PCB 610, and a diffusion plate 630 supported by the discharge grill 315. The reflector 620 is provided with a hole through which the light irradiated from the illumination source passes so that the information displayed on the upper surface of the display unit 600 may be displayed in various letters, numbers, or symbols. Thus, the reflector 620 can concentrate light upwards through the hole. The diffusion plate 630 deflects the light irradiated from the illumination source and guides toward the upper surface of the display unit 600, e.g., the edge portion of the display screen.

The third fan 330 may include an axial flow fan. In detail, the third fan 330 may be operated to discharge the air, which is introduced in the axial direction, in the axial direction. That is, the air which flowed upward toward the third fan 330 via the second fan 260, the first air flow path 272a of the third air guide unit 270, and the discharge flow path 282a of the second discharge guide unit 280 may be discharged from the third fan 330 and discharged to the outside through the second discharge part 305 located above the third fan 330.

The third fan 330 includes a hub 331 having a shaft coupling portion to which the rotation shaft 336 of the third fan motor 335, which is an axial flow fan motor, is coupled, and a plurality of blades 333 which are circumferentially coupled to the hub 331. The third fan motor 335 may be coupled to the lower side of the third fan 330 and disposed inside the third motor housing 337.

The first fan motor 165 and the second fan motor 265 may be disposed in a line with respect to the longitudinal direction of the air cleaner 10. The second fan motor 265 and the third fan motor 335 may be disposed in a line with respect to the longitudinal direction of the air cleaner 10.

In the flow diversion unit 300 further includes a flow guide part 320 which is coupled to the lower side of the third fan housing 310 and guides the air passed through the second discharge guide unit 280 to the third fan housing 310. The flow guide part 320 includes an inlet grill 325 for guiding air inflow into the third fan housing 310. The inlet grill 325 may have a concave shape.

The shape of the second discharge grill 288 of the second discharge guide unit 280 is formed to be concave downwardly in correspondence with the shape of the inflow grill 325. The inlet grill 325 may be seated in the upper side of the second discharge grill 288. Due to such a configuration, the inlet grill 325 may be stably supported by the second discharge grill 288.

The flow diversion unit 300, further includes a rotation guide unit 350 which is installed in the lower side of the flow guide part 320 and guides the rotation of the flow diversion unit 300 in the left and right direction and in the vertical direction. The rotation in the left and right direction may mean the rotation in the clockwise or counterclockwise direction with respect to the axial direction. The rotation in the left and right direction may be referred to as "a first direction rotation", and the rotation in the vertical direction may be referred to as "a second direction rotation".

The rotation guide unit 350 includes a guide body 351 coupled to the flow guide part 320. The guide body 351 includes a lower surface portion 351a in which first and second guide mechanisms are installed, and an edge portion 351b which is provided in the edge of the lower surface portion 351a and configured to protrude downward.

The rotation guide unit 350 includes a first guide mechanism for guiding the first direction rotation of the flow diversion unit 300 and a second guide mechanism for guiding the second direction rotation of the flow diversion unit 300.

In detail, the first guide mechanism includes a first gear motor 363 that generates a driving force and a first gear 360 that is coupled to the first gear motor 363 and can be rotated. For example, the first gear motor 363 may include a step motor for controlling the rotation angle. In addition, the first gear motor 363 may include a motor for bidirectional rotation.

The first gear 360 is coupled to the motor shaft 363a of the first gear motor 363. The first guide mechanism further includes a first gear shaft 362 extended downward, e.g., toward the third air guide unit 270 or the second discharge guide unit 280 from the first gear 360.

The first gear 360 is gear coupled to a first rack 276 of the third air guide unit 270. A plurality of gear teeth are formed in the first gear 360 and the first rack 276. When the first gear motor 363 is driven, the first gear 360 rotates to interlock with the first rack 276. At this time, since the third air guide unit 270 is a fixed configuration, the first gear 360 may be moved along the first rack 276.

The shaft guide groove 277 of the third air guide unit 270 may guide the movement of the first gear 360. In detail, the first gear shaft 362 may be inserted into the shaft guide groove 277. In addition, the first gear shaft 362 may move in the circumferential direction along the shaft guide groove 277 while the first gear 360 rotates.

The first guide mechanism further includes a rotation shaft 354 constituting a rotation center of the flow diversion unit 300. The first gear 360 and the first gear shaft 362 may be rotated with a rotation radius set around the rotation shaft 354. At this time, the set rotation radius is referred to as "a first rotation radius".

The first rack 276 and the shaft guide groove 277 may be formed with a length corresponding to the rotation amount or rotation angle of the flow diversion unit 300. In detail, the circumferential length of the first rack 276 and the shaft guide groove 277 may be formed slightly larger than the circumferential distance at which the flow diversion unit 300 rotates. This may prevent the first gear 360 from being separated from the first rack 276 during the movement of the first gear 360. In addition, this may prevent the first gear 360 from interfering with the end of the shaft guide groove 277 during the movement of the first gear shaft 362.

The rotation shaft 354 may be provided in the lower surface portion 351a of the guide body 351. In detail, the rotation shaft 354 may protrude downward from the lower surface portion 351a. The rotation shaft 354 is inserted into the shaft insertion part 284 of the second discharge guide unit 280, and may be rotated inside the shaft insertion part 284.

That is, when the first gear 360 rotates, the first gear shaft 362 and the first gear 360 rotate in the circumferential direction about the rotation shaft 354. In addition, the rotation shaft 354 is rotated inside the shaft insertion part 284. Therefore, the flow diversion unit 300 may be rotated in the first direction, e.g., the clockwise or counterclockwise direction, with the longitudinal direction as the axial direction.

The first guide mechanism further includes a bearing 353, 355 for accomplishing the first direction rotation of the flow diversion unit 300. The bearing 353, 355 may reduce the frictional force generated during the rotation of the flow diversion unit 300.

The bearing 353, 355 includes a first bearing 353 provided in the lower surface portion 351a of the guide body 351. For example, a ball bearing may be included in the first bearing 353. The first guide mechanism further includes a bearing support part 354 which protrudes downward from the lower surface portion 351a and supports the first bearing 353.

The bearing support part 354 is formed to have a set length, and guides the first bearing 353 to be disposed in a position where the bearing 353 can contact the rotation guide plate 283.

The rotation guide plate 283 includes a bearing groove 285 into which the first bearing 353 is inserted. In the process of rotating the flow diversion unit 300 in the first direction, the first bearing 353 may be inserted into the bearing groove 285 and moved.

At this time, the first bearing 353 may be rotated at a rotation radius set around the rotation shaft 354. At this time, the set rotation radius is referred to as "a second rotation radius". The second rotation radius may be formed smaller than the first rotation radius. That is, the distance from the rotation shaft 354 to the first bearing 353 may be formed shorter than the distance from the rotation shaft 354 to the first gear shaft 362. According to this configuration, the lower surface portion 351a may be stably supported and rotated by the third air guide unit 270 and the second discharge guide unit 280.

When the first gear shaft 362 moves along the shaft guide groove 277, the first bearing 353 may move along the bearing groove 285. In order to smoothly move the first gear shaft 362 and the first bearing 353, the set curvature of the shaft guide groove 277 and the set curvature of the bearing groove 285 may be the same.

The bearing 353, 355 further includes the second bearing 355. The second bearing 355 may be rotatably installed in the edge portion 351b. In the edge portion 351b, a bearing insertion portion 351c to which the second bearing 355 is coupled may be formed. The bearing insertion portion 351c may be configured to be recessed upward from the bottom surface of the edge portion 351b. In addition, a plurality of second bearings 355 may be provided.

The second bearing 355 may be provided to be in contact with the discharge inner wall 282 of the second discharge guide unit 280. That is, the inner circumferential surface of the discharge inner wall 282 may form a contact surface of the second bearing 355. Since the second bearing 355 rotates along the inner circumferential surface of the discharge inner wall 282 about the rotation shaft 354, the first direction rotation of the flow diversion unit 300 may be performed.

Referring to FIG. 9, the first direction rotation of the flow diversion unit 300 is explained.

When the first gear motor 363 operates, the first gear 360 may rotate. When viewed from above, the first gear motor 363 rotates in the clockwise or counterclockwise direction, and correspondingly, the first gear 360 may rotate in the clockwise or counterclockwise direction.

For example, when the first gear motor 363 rotates clockwise, the first gear 360 and the first gear shaft 362 may move in the counterclockwise direction along the shaft guide groove 277. On the other hand, when the first gear motor 363 rotates in the counterclockwise direction, the first gear 360 and the first gear shaft 362 may move in the clockwise direction along the shaft guide groove 277.

As the first gear 360 moves in the clockwise or counterclockwise direction, the flow diversion unit 300 may rotate in the same direction as the moving direction of the first gear 360. In this process, the first bearing 353 may move along the bearing groove 285, and the second bearing 355 may move along the inner circumferential surface of the discharge inner wall 282.

Due to this action, the flow diversion unit 300 may be stably rotated along the set path in the left and right direction.

Figure 11:
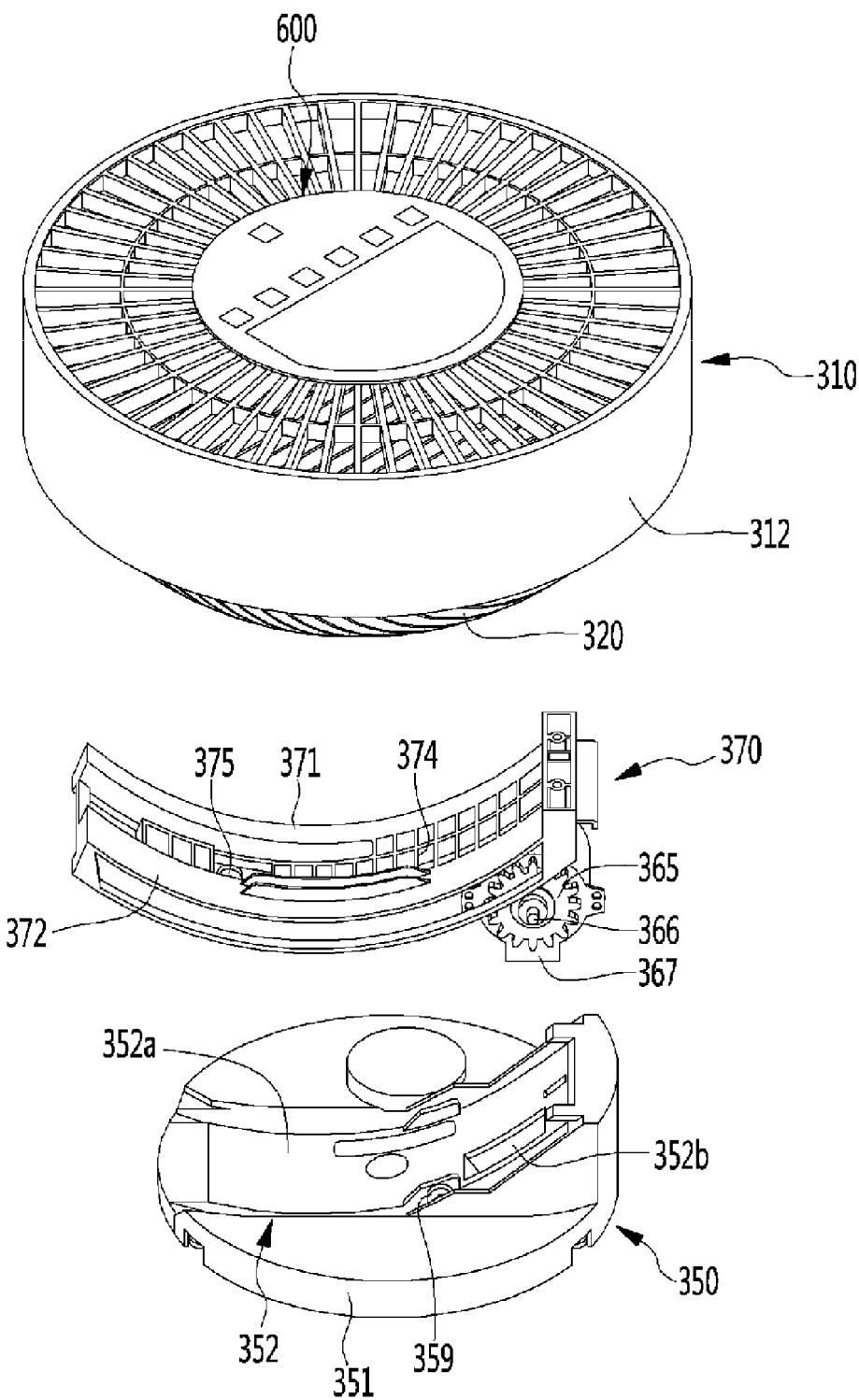
FIG. 11 is an exploded perspective view of an example flow diversion unit.
Figure 12:
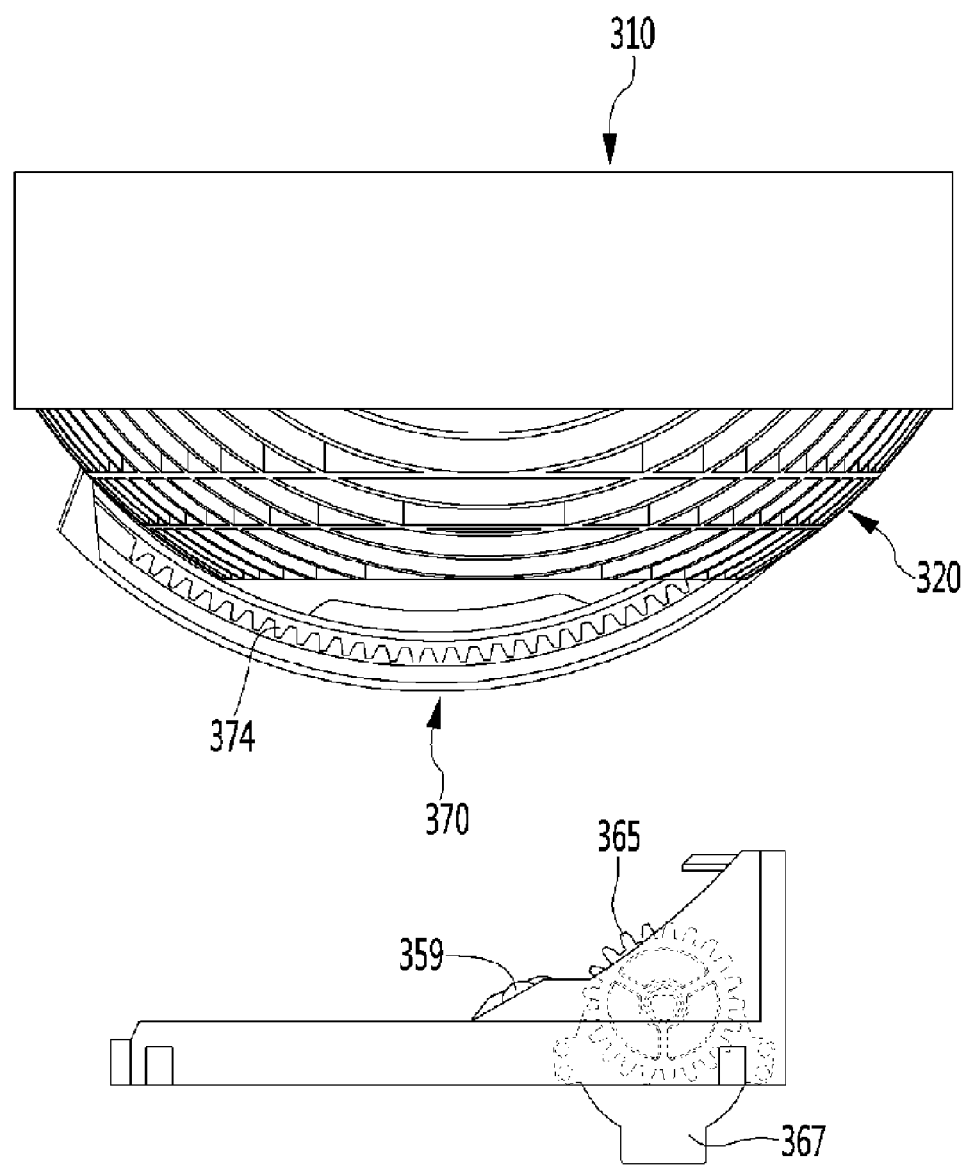
FIG. 12 is an exploded perspective view of an example drive unit and an example fixing unit of an example flow diversion unit.
Figure 13:
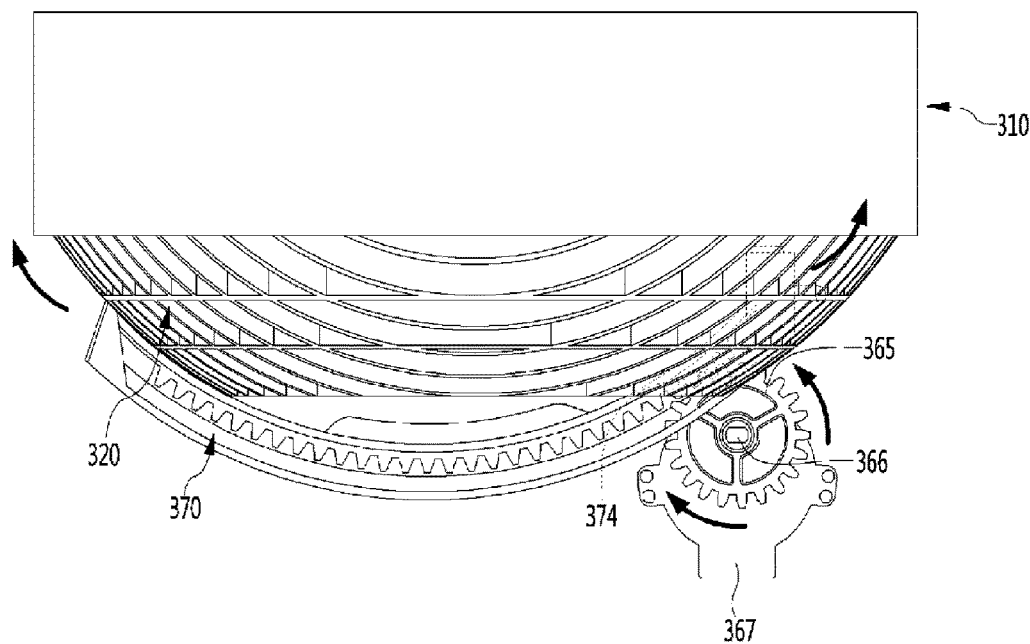
FIG. 13 is a view of an interlocking state of an example second rack and an example second gear provided in a flow diversion unit.

FIG. 11 is an exploded perspective view showing a configuration of a flow diversion unit, FIG. 12 is an exploded perspective view showing a configuration of a drive unit and a fixing unit of a flow diversion unit, and FIG. 13 is a view showing an interlocking state of a second rack and a second gear provided in a flow diversion unit.

Referring to FIGS. 7, 11, and 12, the flow diversion unit 300 includes a second guide mechanism for guiding the vertical rotation of the flow diversion unit 300.

In detail, the second guide mechanism includes a fix guide member 352 fixed to the guide body 351. The central shaft 354 may be provided in the lower surface of the fix guide member 352.

The fix guide member 352 includes a first guide surface 352a that supports the lower side of the rotation guide member 370 and guides the second direction rotation of the rotation guide member 370. The first guide surface 352a forms at least a portion of the upper surface of the fix guide member 352, and may be roundly extended upwardly, in correspondence with the rotation path of the rotation guide member 370.

The fix guide member 352 further includes a first guide bearing 359 that is provided to be in contact with the rotation guide member 370, and can reduce the friction force generated during the rotational movement of the rotation guide member 370. The first guide bearing 359 may be located in the side of the first guide surface 352a.

The fix guide member 352 further includes a second gear insertion portion 352b into which the second gear 365 can be inserted, in order to rotate the rotation guide member 370. The second gear insertion portion 352b is formed in one side of the first guide surface 352a. For example, the second gear insertion portion 352b may be formed by cutting at least a portion of the first guide surface 352a.

The second gear 365 is located below the first guide surface 352a, and at least a portion of the second gear 365 may be configured to penetrate through the second gear insertion portion 352b and protrude to the upper side of the second gear insertion portion 352b.

The second guide mechanism further includes a second gear motor 367 that is coupled to the second gear 365 and provides a driving force. For example, the second gear motor 367 may include a step motor. The second gear motor 367 may include a motor for bidirectional rotation.

The second guide mechanism further includes a second gear shaft 366 extended from the second gear motor 367 to the second gear 365. The second gear shaft 366 may protrude to the side of the second gear motor 367. When the second gear motor 367 is driven, the second gear shaft 366 and the second gear 365 may be rotated together.

The second guide mechanism further includes a rotation guide member 370 that is disposed above the fix guide member 352 and provided to be rotatable in the vertical direction. The rotation guide member 370 may be coupled to the lower side of the flow guide part 320.

In detail, the rotation guide member 370 includes a body part 371 supported by the fix guide member 352. In addition, the body part 371 includes a second guide surface 372 that moves along the first guide surface 352a. The second guide surface 372 may be rounded downward in correspondence with the curvature of the first guide surface 352a.

The rotation guide member 370 may include a second guide bearing 375 that is provided to be in contact with the fix guide member 352 and can reduce frictional force generated during the rotational movement of the rotation guide member 370. The second guide bearing 375 is located in the side of the second guide surface 372, and may move along the first guide surface 352a while the rotation guide member 370 rotates.

The rotation guide member 370 further includes a second rack 374 interlocked with the second gear 365. A plurality of gear teeth are formed in the second gear 365 and the second rack 374, and the second gear 365 and the second rack 374 may be gear-coupled through the plurality of gear teeth.

When the second gear motor 367 is driven, the rotation guide member 370 rotates in the vertical direction by interlocking the second gear 365 and the second rack 374. Therefore, the flow diversion unit 300 may perform the second direction rotation according to the movement of the rotation guide member 370.

Referring to FIG. 13, the second direction rotation of the flow diversion unit 300 is explained.

When the second gear motor 367 operates, the second gear 365 may rotate. The second gear motor 367 may rotate in the clockwise or counterclockwise direction with respect to the radial direction, and correspondingly, the second gear 365 may rotate in the clockwise or counterclockwise direction.

For example, when the second gear motor 367 rotates in the clockwise direction, the second gear 365 rotates in the clockwise direction, and the second rack 374 may rotate in the counterclockwise direction by interlocking with the second gear 365. As the second rack 374 rotates, the rotation guide member 370 and the flow guide part 320 may rotate together. As a result, the fan housing 310 may rotate in the counterclockwise direction.

On the other hand, when the second gear motor 367 rotates in the counterclockwise direction, the second gear 365 rotates in the counterclockwise direction and the second rack 374 may be rotated in the clockwise direction by interlocking with the second gear 365. As the second rack 374 rotates, the rotation guide member 370 and the flow guide part 320 may rotate together. As a result, the fan housing 310 may rotate in the clockwise direction.

Due to this action, the flow diversion unit 300 may be stably rotated along the set path in the vertical direction.

Figure 14:
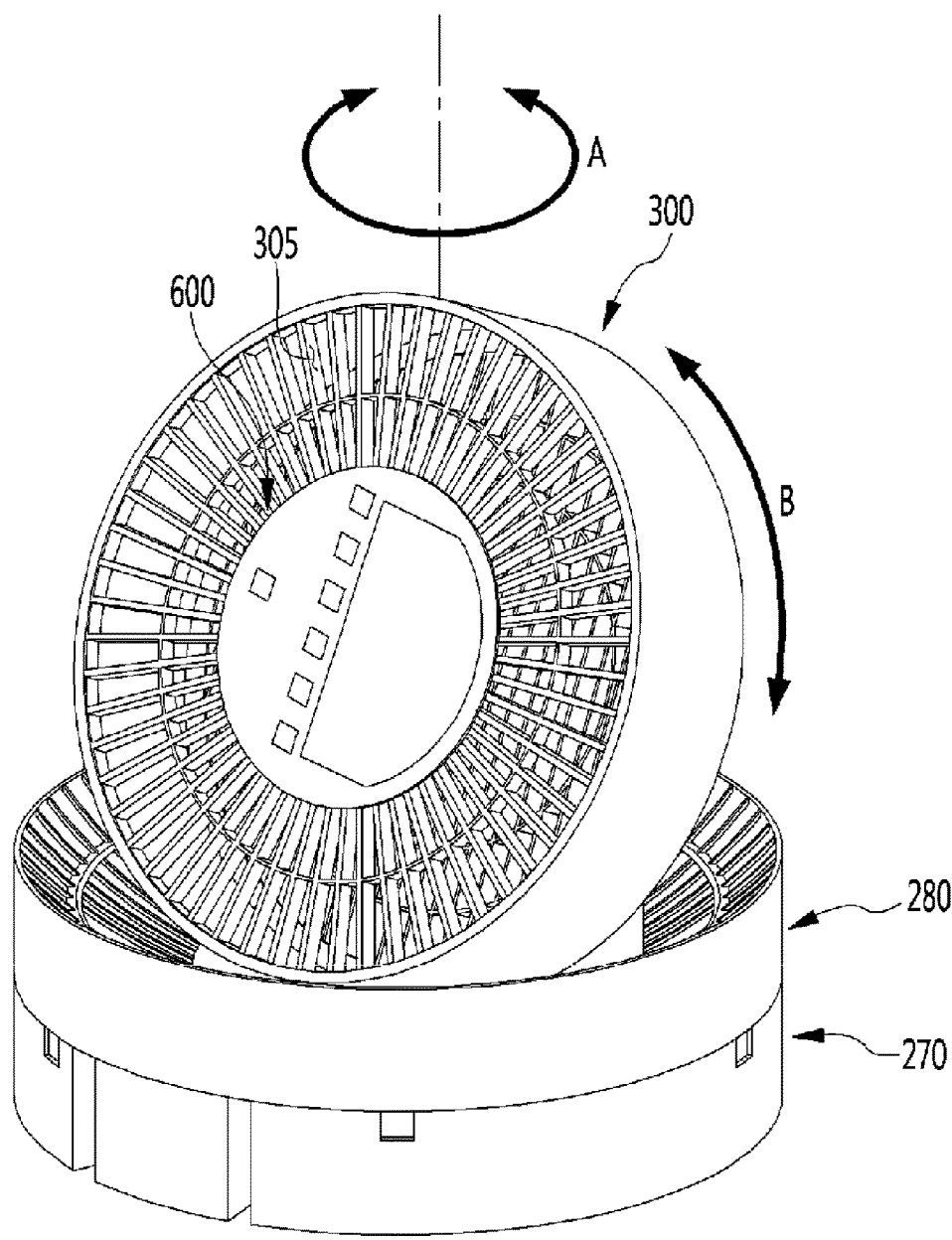
FIGS. 14 and 15 are views of a state in which an example flow diversion unit is located in a second position.
Figure 15:
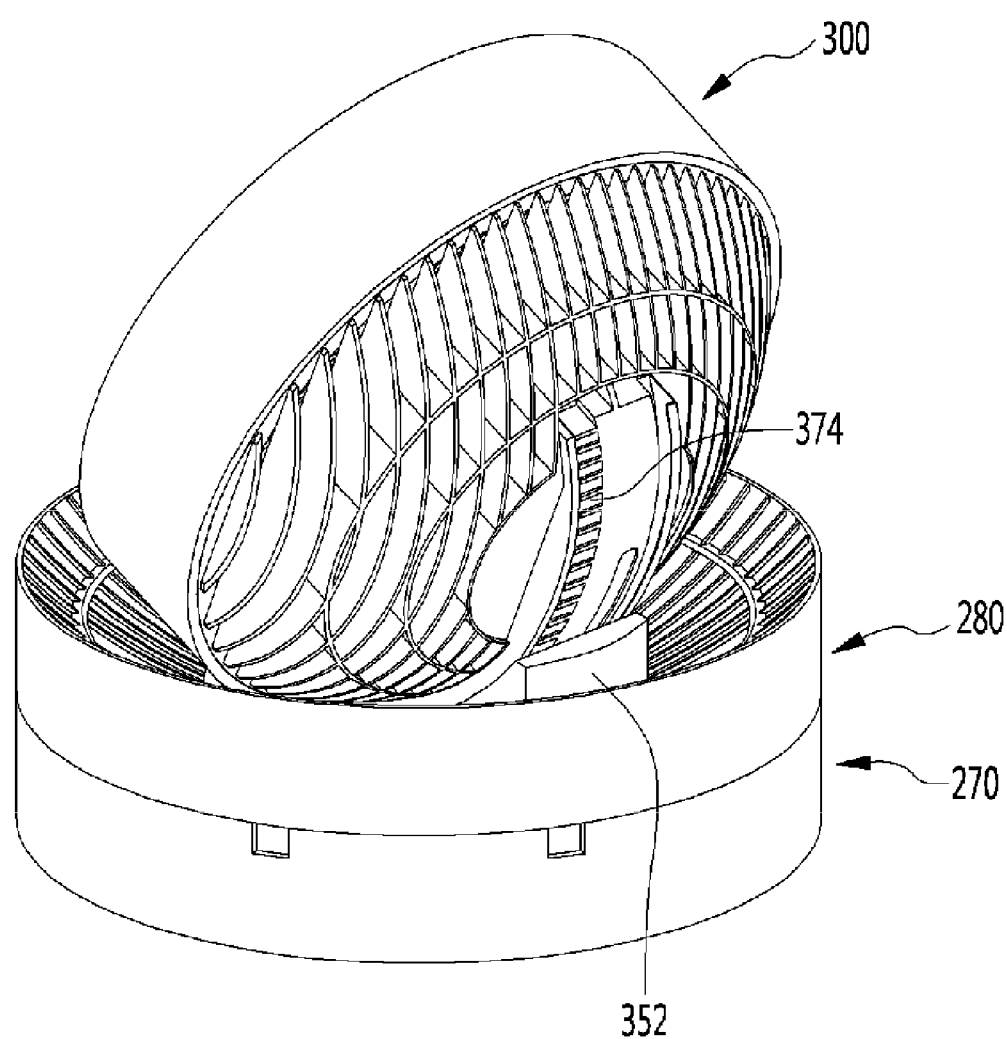
Figure 16:
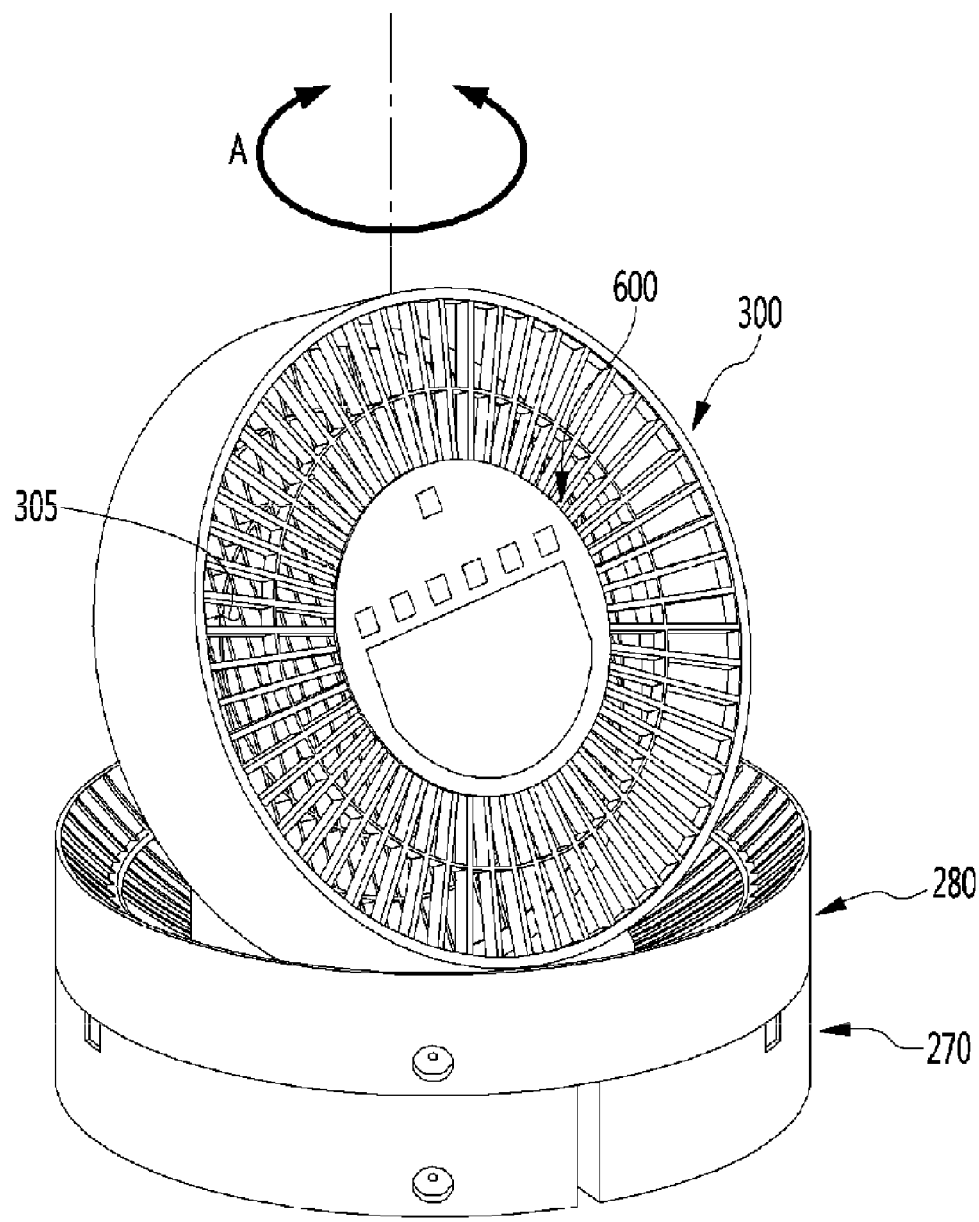
FIG. 16 is a view of a state in which the flow diversion unit of FIG. 14 is rotated in the A direction.

FIGS. 14 and 15 are views showing a state in which a flow diversion unit is located in a second position, and FIG. 16 is a view showing a state in which the flow diversion unit of FIG. 14 is rotated in the A direction.

FIGS. 14 and 15 show the state in which the flow diversion unit 300 protrudes to the upper side of the second discharge guide unit 280, e.g., the state in which the rotation guide member 370 rotates upwards so that the fan housing 310 stands in an upright position (a second position). On the other hand, FIGS. 1 and 2 show the state in which the flow diversion unit 300 is laid (a first position).

That is, the flow diversion unit 300 may be operated to be rotatable in the vertical direction in the direction of "B" shown in FIG. 14, so that it can be located in the first position or the second position. When the flow diversion unit 300 is located in the first position, the inlet grill 325 is seated on the upper surface of the second discharge grill 288. On the other hand, when the flow diversion unit 300 is located in the second position, the inlet grill 325 may be spaced upward from the upper surface of the second discharge grill 288.

The third fan 330 may be selectively operated depending on whether the flow diversion unit 300 is located in the first position or the second position.

In detail, in the state where the flow diversion unit 300 is located in the first position, the first and second fans 160 and 260 may rotate to generate air flow. Due to operation of the first fan 160, the suction and discharge of the air (a first flow) may be generated in the lower portion of the air cleaner 10. In addition, due to the operation of the second fan 260, the suction and discharge of the air (a second flow) in the upper portion of the air cleaner 10 may be generated. The first flow and the second flow may be separated by the partition unit 400.

In addition, the third fan 330 may be selectively operated. When the third fan 330 is operated, the second flow may be generated more strongly. That is, by the second fan 260 and the third fan 330, a strong discharge air flow in the upper portion of the air cleaner 10 may be generated, and may be discharged through the second discharge part 305. Obviously, the third fan 330 may not operate.

Meanwhile, in the state where the flow diversion unit 300 is located in the second position, the first and second fans 160 and 260 may rotate to generate the first and second flows. In addition, the third fan 330 may operate.

Due to operation of the third fan 330, at least some of the air discharged through the discharge flow path 282a of the second discharge guide unit 280 flows into the third fan housing 310, and may be discharged from the second discharge part 305 via the third fan 330. By this action, the purified air may reach a position far from the air cleaner 10 (see FIG. 19).

In addition, the flow diversion unit 300 may be rotated in the left and right direction with respect to the axial direction, while being located in the second position. FIG. 14 shows a state in which the flow diversion unit 300 is located to face one direction (based on FIG. 14, the left direction) while being located in the second position, and FIG. 16 shows a state in which the flow diversion unit 300 is located to face the other direction (based on FIG. 14, the right direction).

In addition, the one direction may be a direction toward the left 45 degrees based on the front of the air cleaner 10, and the other direction may be a direction toward the right 45 degrees based on the front of the air cleaner 10. That is, the rotation angle of the flow diversion unit 300 may form about 90 degrees.

As described above, since the flow diversion unit 300 may be rotated in the left and right direction based on the axial direction, there is an effect of sending a discharge air stream to a distance in various directions around the air cleaner 10.

Figure 17:
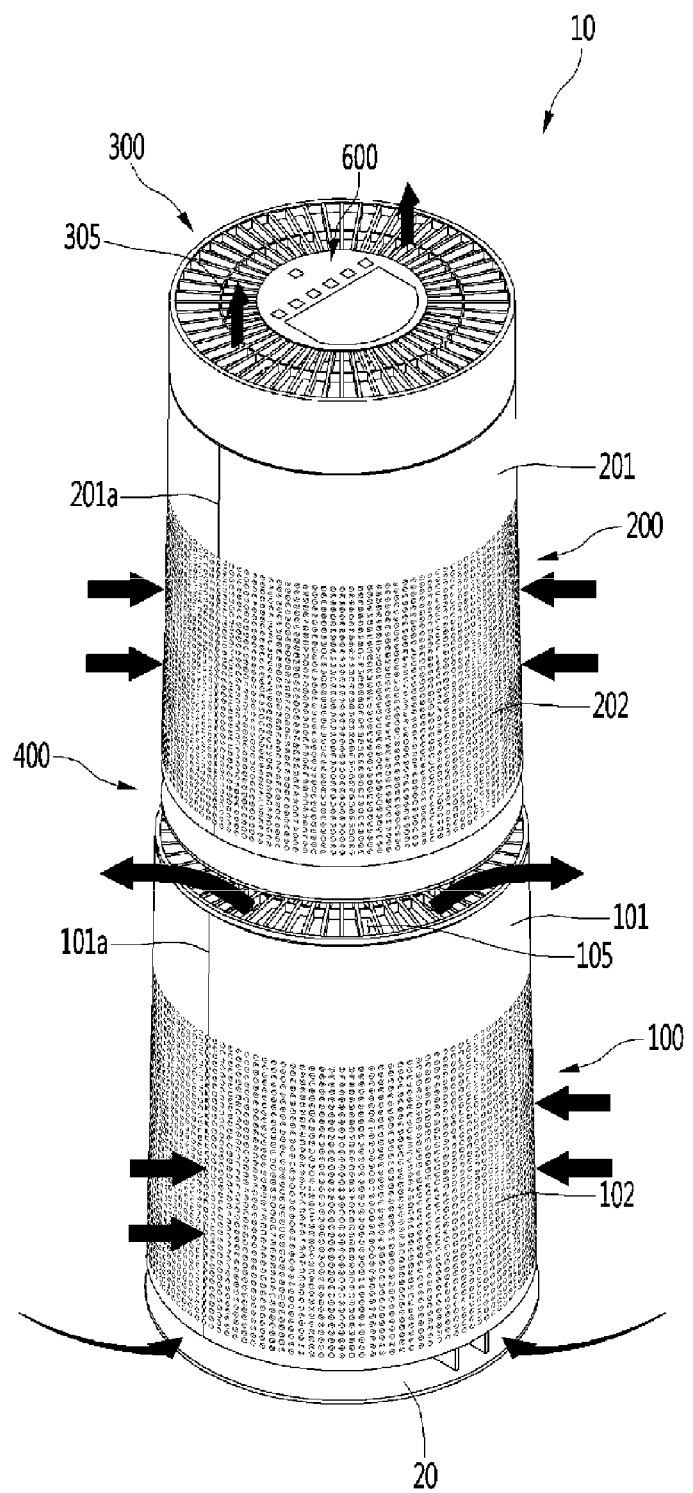
FIGS. 17 to 19 are views of a state of air flow in an example air cleaner.
Figure 18:
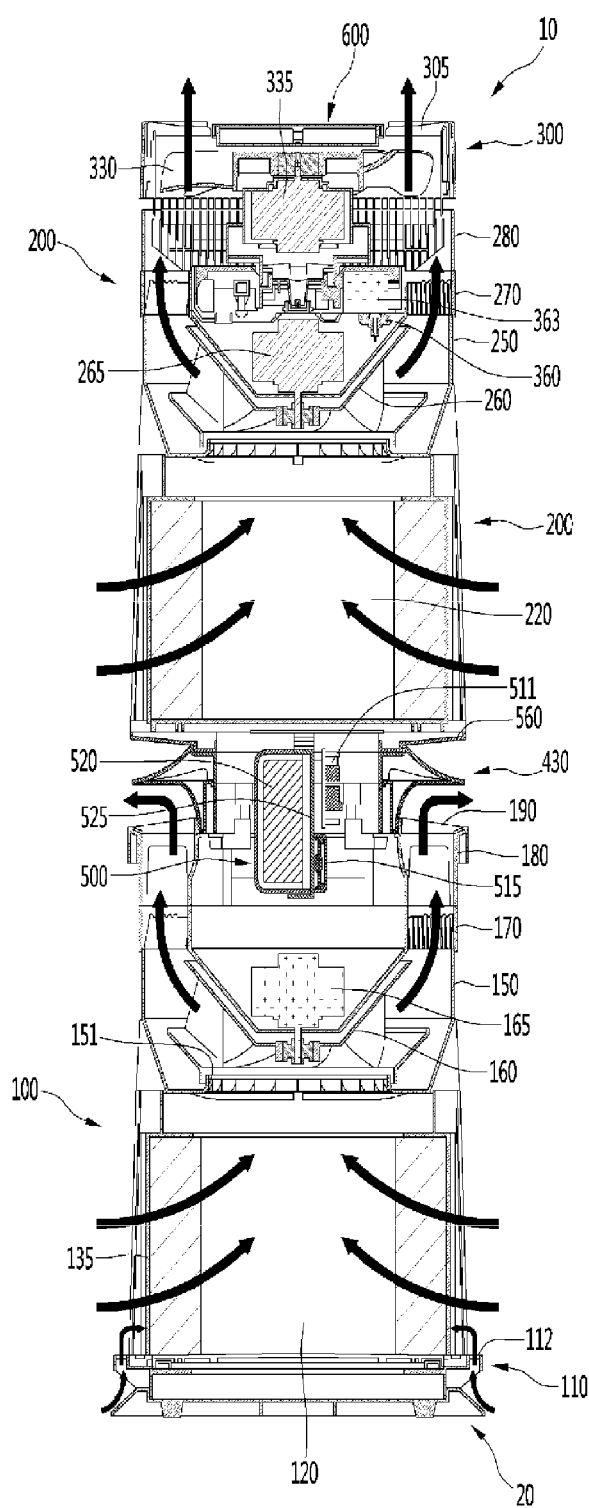

FIGS. 17 to 19 are views showing a state of air flow in an air cleaner.

First, the flow of air according to the driving of the first blowing unit 100 will be described. When the first fan 160 is driven, indoor air is sucked into the first case 101 through the first suction part 102 and the base suction part 103. The sucked air passes through the first filter member 120, and, in this process, foreign substances in the air may be filtered. In addition in the process in which the air passes through the first filter member 120, the air is sucked in the radial direction of the first filter member 120 and filtered, and then flows upward.

The air passed through the first filter member 120 flows upward of the radial direction while passing through the first fan 160, and a stable upward flow is achieved while passing through the first and second air guide units 170 and 180. The air passed through the first and second air guide units 170 and 180 passes through the first discharge guide unit 190, and flows upward through the first discharge part 105. The air discharged through the first discharge part 105 is guided by the partition plate 430 located above the first discharge guide unit 190 and discharged to the outside of the air cleaner 10.

On the other hand, when the second fan 260 is driven, the indoor air is sucked into the second case 201 through the second suction part 202. The sucked air passes through the second filter member 220, and, in this process, foreign substances in the air may be filtered. In addition, in the process in which the air passes through the second filter member 220, the air is sucked in the radial direction of the first filter member 120 and filtered, and then flows upward.

The air passed through the second filter member 220 flows upward of the radial direction while passing through the second fan 160, and a stable upward flow is achieved while passing through the third air guide unit 270 and the second discharge guide unit 280. The air passed through the third air guide unit 270 and the second discharge guide unit 280 may be discharged through the second discharge part 305 via the flow diversion unit 300.

The flow diversion unit 300 may be rotatably provided in the vertical direction by the second guide mechanism. For example, as shown in FIGS. 17 and 18, when the flow diversion unit 300 is located in the first position, the air discharged from the flow diversion unit 300 flows upward.

On the other hand, as shown in FIG. 19, when the flow diversion unit 300 is located in the second position, the air discharged from the flow diversion unit 300 may flow toward the front upper side. By the flow diversion unit 300, the air volume of the air discharged from the air cleaner 10 is increased, and the purified air may be supplied to a position far from the air cleaner 10.

In detail, when the third fan 330 of the flow diversion unit 300 is driven, at least a part of the air discharged from the second discharge guide unit 280 may be introduced into the third fan housing 310. In addition, the introduced air may pass through the third fan 330 and be discharged to the outside through the second discharge part 305.

On the other hand, the flow diversion unit 300 may be rotated in the left and right direction by the first guide mechanism while being located in the second position. For example, as shown in FIGS. 14 and 15, when the flow diversion unit 300 faces the front upper side, the air discharged through the second discharge part 305 may flow toward the front upper side. On the other hand, as shown in FIG. 16, when the flow diversion unit 300 faces the rear upper side, the air discharged through the second discharge part 305 may flow toward the rear upper side.

According to this action, since the air discharged from the air cleaner 10 may progress forward not progress upward, the airflow toward a space relatively far from the air cleaner 10 may be generated. In addition, since the third fan 330 is separately provided in the flow diversion unit 300, the blowing force of the discharged air may be increased.

In addition, since the flow diversion unit 300 may perform the first direction rotation, air may be discharged to both front sides of the air cleaner 10, thereby providing airflow toward a relatively large indoor space.

According to the operation mode of the air cleaner 10, the flow diversion unit 300 may selectively operate. When the air cleaner 10 is operated in a normal operation mode (a first operation mode), as shown in FIGS. 17 and 18, the flow diversion unit 300 is located in the first position of lying down. In addition, the first and second blowing units 100 and 200 may be driven to form a plurality of independent air flows.

That is, when the first blowing unit 100 is driven, the air is sucked through the first suction part 102 and the base suction part 103, and passes the first filter member 120 and the first fan 160 to be discharged through the first discharge part 105. In addition, when the second blowing unit 200 is driven, the air is sucked through the second suction part 202, passes the second filter member 220 and the second fan 260, and may pass through the third fan 330. In addition, it may be discharged upward through the second discharge part 305. At this time, the third fan 330 may be turned off. Obviously, the third fan 330 may be driven so as to strongly form a discharge air flow toward the second discharge part 305.

Meanwhile, in the state of being located in the first position, the flow diversion unit 300 may change the air flow in both front directions of the air cleaner 10, while rotating in the first direction.

On the other hand, when the air cleaner 10 is operated in a flow diversion mode (a second operation mode), as shown in FIG. 19, the flow diversion unit 300 is rotated upwards, so that it can protrude from the upper end of the air cleaner 10. Meanwhile, in the flow diversion mode, the driving of the first and second blowing units 100 and 200 may be the same as the driving of the first and the second blowing units 100 and 200 in the normal operation mode.

In addition, the third fan 330 is driven. Thus, at least a part of the air passed through the discharge flow path 282a of the second fan 260 and the second discharge guide unit 280 is introduced into the fan housing 310. In addition, at least some of the introduced air may be discharged toward the front upper side or the rear upper side of the air cleaner 10 while passing through the third fan 330.

On the other hand, in order to reduce noise while maximizing the air volume discharged to the outside of the air cleaner 10, the guide rib 175 included in the first air guide unit 170 and the guide rib 275 included in the third air guide unit 270 are formed in a special structure.

The first filter frame 130 and the second filter frame 230 may be formed in the same structure, the first fan housing 150 and the second fan housing 250 may be formed in the same structure, the first fan 160 and the second fan 260 may be formed in the same structure, the first fan motor 165 and the second fan motor 265 may be formed in the same structure, and the first air guide unit 170 and the third air guide unit 270 may be formed in the same structure. Therefore, hereinafter, only the second filter frame 230, the second fan housing 250, the second fan 260, the second fan motor 265, and the third air guide unit 270 will be described as an example, but the second filter frame 230 is named as a filter frame 230, the second fan housing 250 as a fan housing 250, the second fan 260 as a fan 260, the second fan motor 265 as a fan motor 265, and the third air guide unit 270 as an air guide unit 270.

Figure 20:
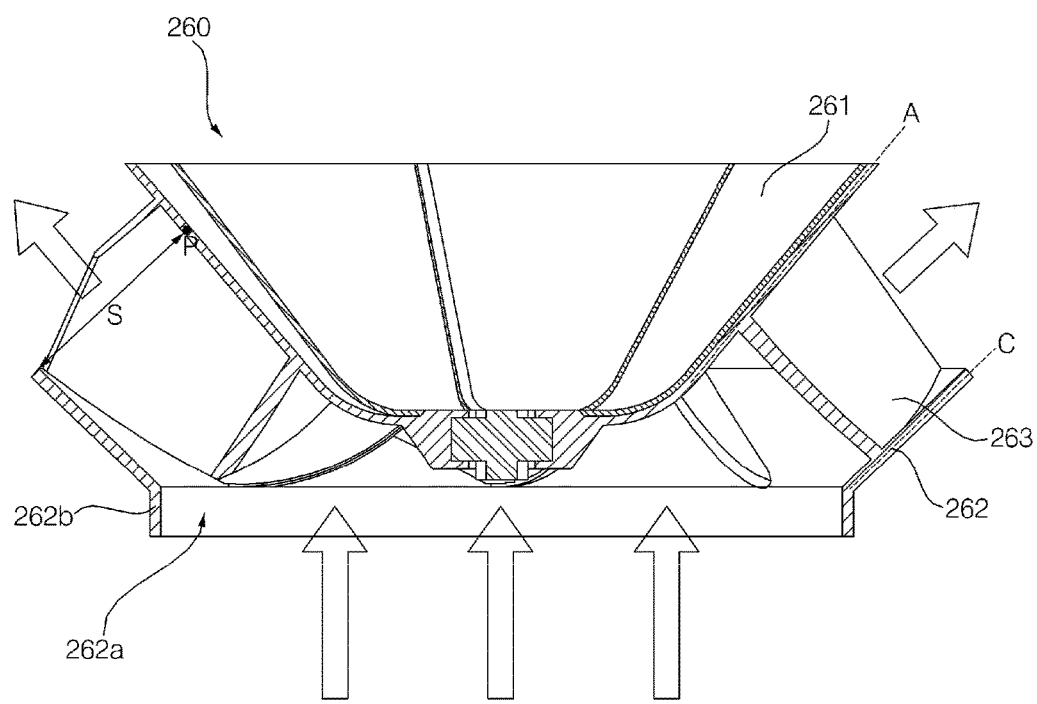
FIG. 20 is a cross-sectional view of a fan of an example air cleaner.
Figure 21:
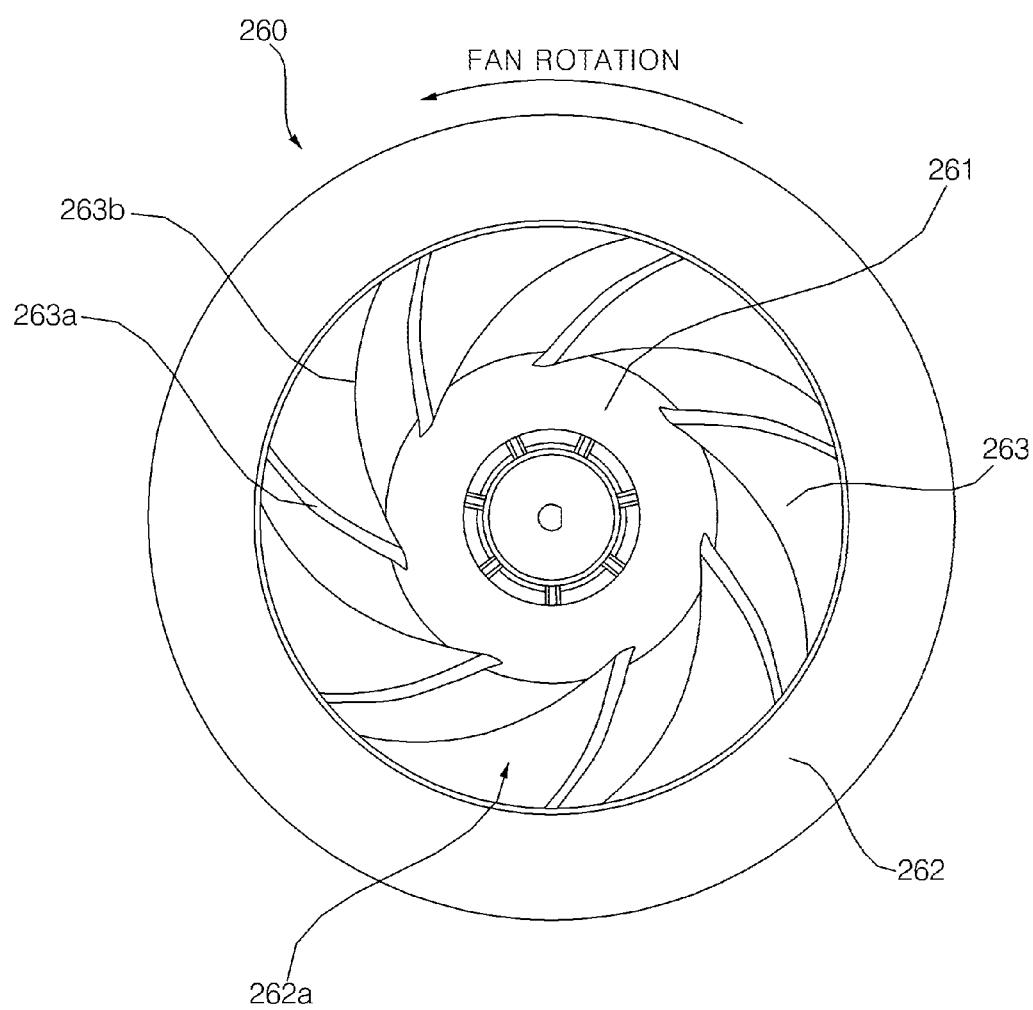
FIG. 21 is a bottom view of the fan shown in FIG. 20.
Figure 22:
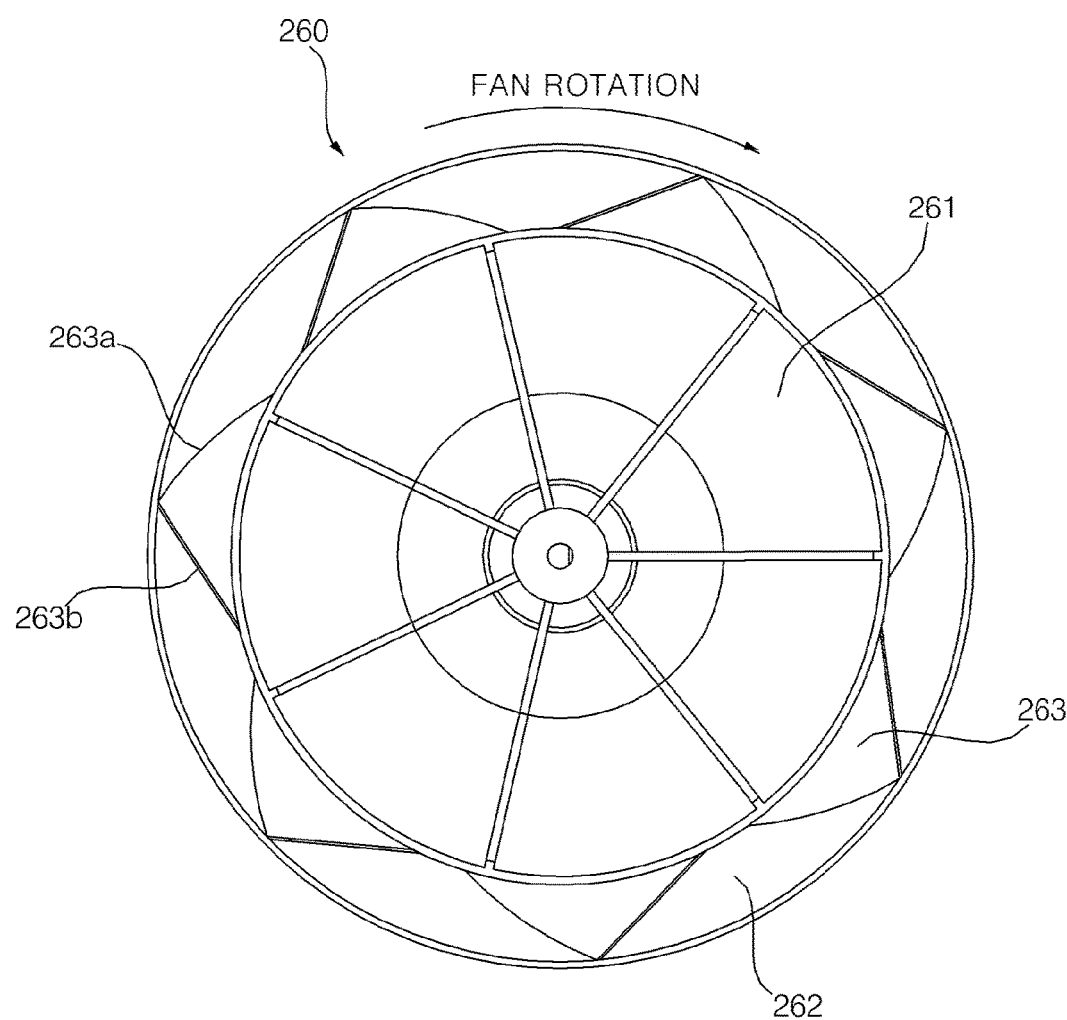
FIG. 22 is a plan view of the fan shown in FIG. 20.

FIG. 20 is a cross-sectional view of a fan of an air cleaner, and FIG. 21 is a bottom view of the fan shown in FIG. 20.

Referring to FIGS. 3, 20 to 22, the fan 260 is formed as a mixed flow fan that sucks air in the axial direction and discharges the sucked air to between the axial direction and the radial direction. That is, the fan 260 includes a hub 261 having a center that is coupled to the rotation shaft of the fan motor 265 and extended in direction of the annular air flow path 272a while increasing a radius, a shroud 262 which is disposed to be spaced apart from the hub 261 and extended in a direction in which the hub 261 is extended, and has a central portion where a suction port 262a for sucking air is formed, and a plurality of blades 263 disposed between the hub 261 and the shroud 262.

A plurality of blades 263 are spaced apart from each other in the circumferential direction and provided between the hub 261 and the shroud 262. The upper end of the blade 263 is coupled to the lower surface of the hub 261 and the lower end is coupled to the upper surface of the shroud 262. In some implementations, the cross section of the blade 263 is in the form of an airfoil.

A side end through which air is introduced from the blade 263 is referred to as a leading edge 263a, and a side end through which air is discharged is referred to as a trailing edge 263b.

The trailing edge 263b of the blade 263 is formed to be inclined with respect to the vertical direction so that the discharged air is inclined upwardly in the radial direction. In some implementations, the trailing edge 263b of the blade 263 is formed to be inclined to the right as it progresses to the upper side when viewed from the side of the fan 260 in the rotation shaft direction. The leading edge 263a of the blade 263 may be formed shorter than the trailing edge 263b so that the discharged air is inclined upwardly in the radial direction.

The hub 261 is formed to protrude downward as it progresses toward the center. The lower portion of the inner wall 272 of the air guide unit 270 is inserted into the hub 261 through the opened upper side of the hub 261, so that at least a portion of the fan motor 265 is disposed inside the hub 261. Due to such a structure, the height occupied by the fan motor 265 and the fan 260 may be minimized to minimize the height of the air cleaner as a whole.

The center of the hub 261 is coupled to the rotation shaft of the fan motor 265 disposed above the hub 261. The rotation shaft of the fan motor 265 may pass through the hole formed in the bottom surface of the inner wall 272 and the hole formed in the center of the hub 261 sequentially and then be coupled to the hub 261 by a fastening member. The hub 261 is disposed spaced apart above the shroud 262. A plurality of blades 263 are coupled to the bottom surface of the hub 261.

The outer circumferential end of the hub 261 is formed to obliquely face in the direction opposite to the direction of the suction port 262a. The outer circumferential end of the hub 261 means the upper circumference of the hub 261. In some implementations, the direction of the outer circumferential end of the hub 261 forms about 45 degrees with respect to the horizontal direction. The outer circumferential end of the hub 261 is formed to be inclined upwardly so that air is obliquely discharged upwardly.

The hub 261 is formed in the form of a straight line A in which the longitudinal section is inclined in the direction opposite to the direction of the suction port 262a from the central portion to the outer circumferential end of the hub 261. In some implementations, the hub 261 is formed in the form of a straight line A in which the longitudinal section is inclined to the outer circumferential end from the portion to which the leading edge 263a of each of the plurality of blades 263 is connected. The hub 261 is formed to have a diameter that becomes uniformly larger from the center portion to the outer circumferential end. In some implementations, the hub 261 is formed to have a diameter that becomes uniformly larger from the portion to which the leading edge 263a of each of the plurality of blades 263 is connected to the outer circumferential end.

The shroud 262 is formed in a bowl shape in which a circular suction port 262a through which air is sucked is formed in the central portion thereof. The suction port 262a of the shroud 262 is disposed to correspond to a circular discharge port 232a formed above the filter frame 230. That is, the discharge port 232a of the filter frame 230 is formed in a portion corresponding to the suction port 262a of the shroud 262. The diameter of the suction port 262a may be larger than the diameter of the discharge port 232a of the filter frame 230. The shroud 262 is provided with a suction guide 262b protruding downwardly vertically formed in the circumferential portion of the suction port 262a. The filter frame 230 is provided with a discharge guide 232b protruding upwardly vertically formed in the circumferential portion of the discharge port 232a. The discharge guide 232b is inserted into suction guide 262b.

The shroud 262 is disposed spaced apart below the hub 261. A plurality of blades 263 are coupled to the top surface of the shroud 262.

The outer circumferential end of the shroud 262 is formed to be inclined in a direction opposite to the direction of the suction port 262a. The outer circumferential end of the shroud 262 means the upper circumference of the shroud 262. In some implementations, the outer circumferential end of the shroud 262 forms about 45 degrees with respect to the horizontal direction. The outer circumferential end of the shroud 262 is formed to be inclined upward so that air is discharged to be inclined upward. The shroud 262 may have a direction in which the outer circumferential end thereof is substantially parallel to a direction in which the outer circumferential end of the hub 261 faces.

The longitudinal section of the shroud 262 is formed in the form of a straight line C inclined in a direction opposite to the direction of the suction port 262a from the upper end of the suction guide 262b to the outer circumferential end of the shroud 262. In some implementations, the longitudinal section of the shroud 262 is formed in the form of a straight line C inclined from the portion to which the leading edge 263a of each of the plurality of blades 263 is connected to the outer circumferential end of the shroud 262. The shroud 262 is formed to have a diameter that becomes uniformly larger from the upper end of the suction guide 262b to the outer circumferential end. In some implementations, the shroud 262 is formed to have a diameter that becomes uniformly larger from the portion to which the leading edge 263a of each of the plurality of blades 263 is connected to the outer circumferential end of the shroud 262.

In some implementations, the inclined straight line C portion of the longitudinal section of the shroud 262 and the inclined straight line A portion of the longitudinal section of the hub 261 are substantially parallel. In some implementations, the distance between the shroud 262 and the hub 261 may be slightly widened as it progresses toward the outer circumferential end.

In some implementations, a diameter of the outer circumferential end of the shroud 262 is larger than a diameter of the outer circumferential end of the hub 261. In some implementations, the outer circumferential end of the shroud 262 is more protruded in the radial direction than the outer circumferential end of the hub 261. In some implementations, that the outer circumferential end of the hub 261 is more protruded in the radial direction than the point P where the straight line S forming the shortest distance from the outer circumferential end of the shroud 262 to the hub 261 and the hub 261 meet each other.

Figure 23:
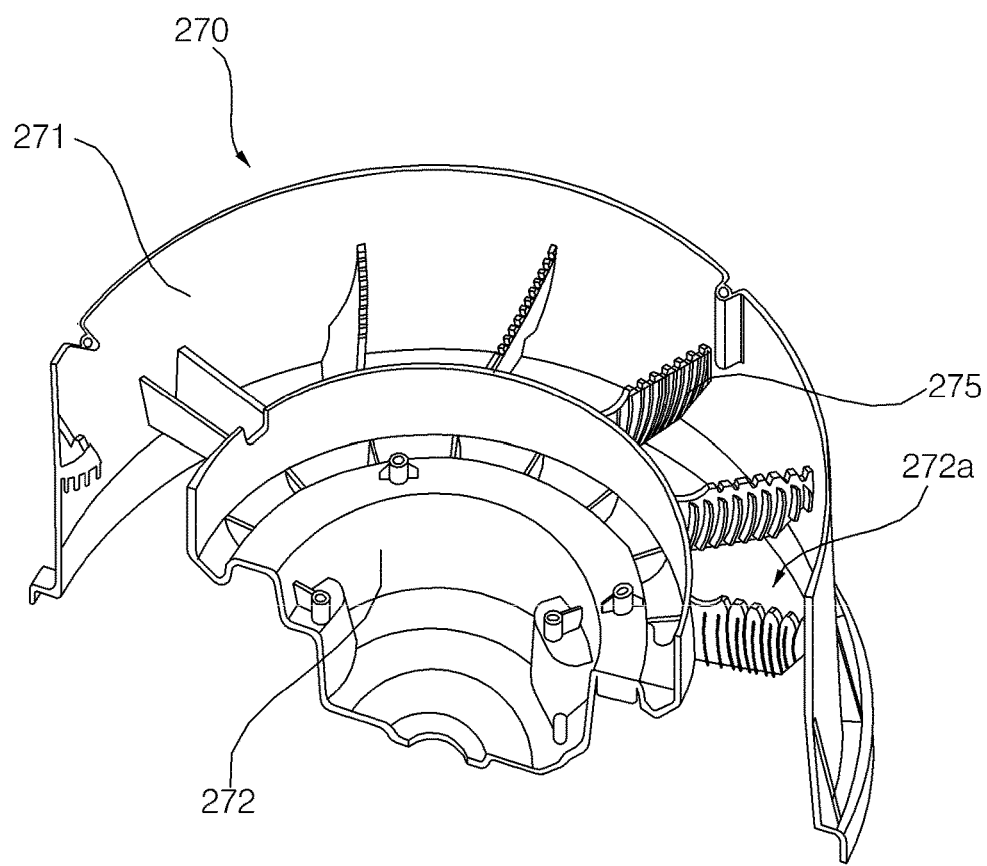
FIG. 23 is a perspective cross-sectional view of an air guide unit of an example air cleaner.
Figure 24:
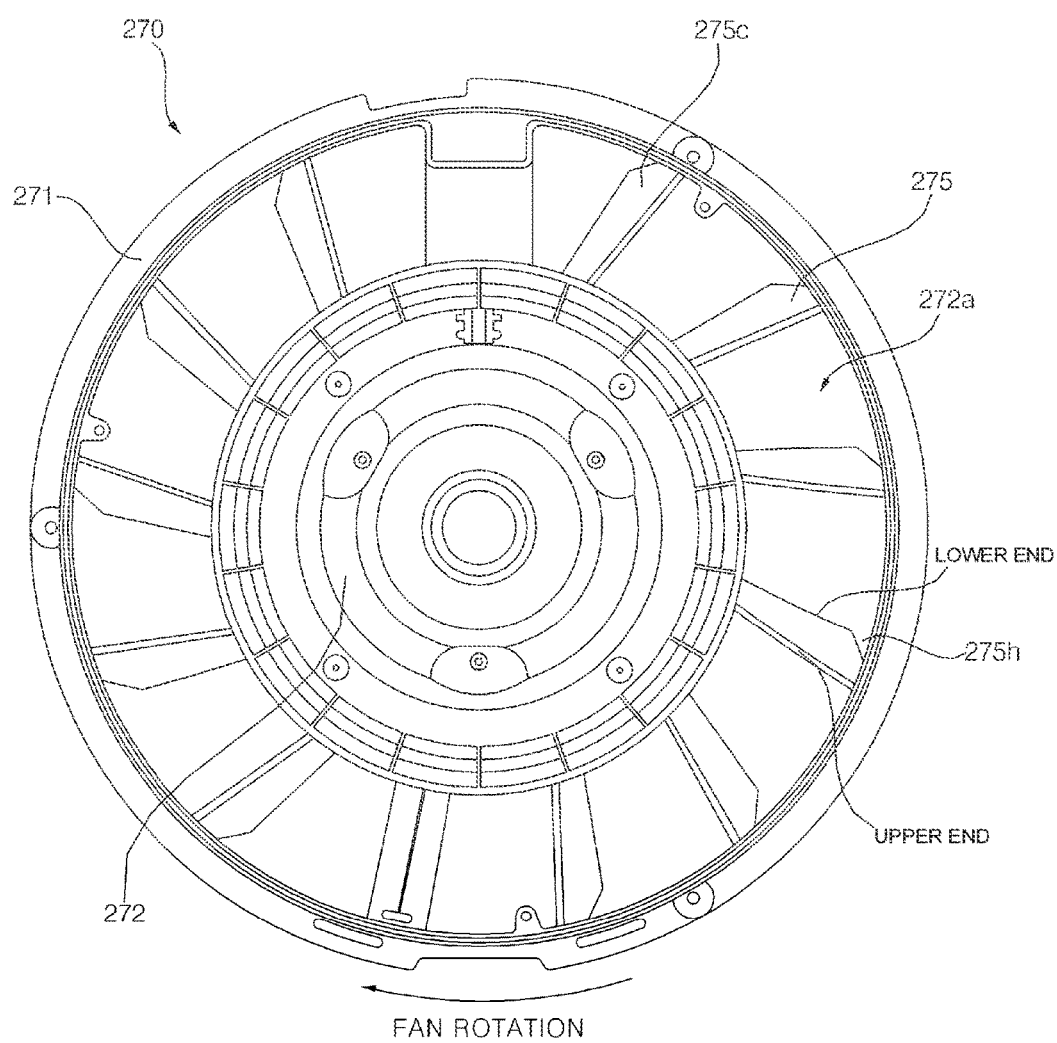
FIG. 24 is a plan view of the air guide unit shown in FIG. 23.
Figure 25:
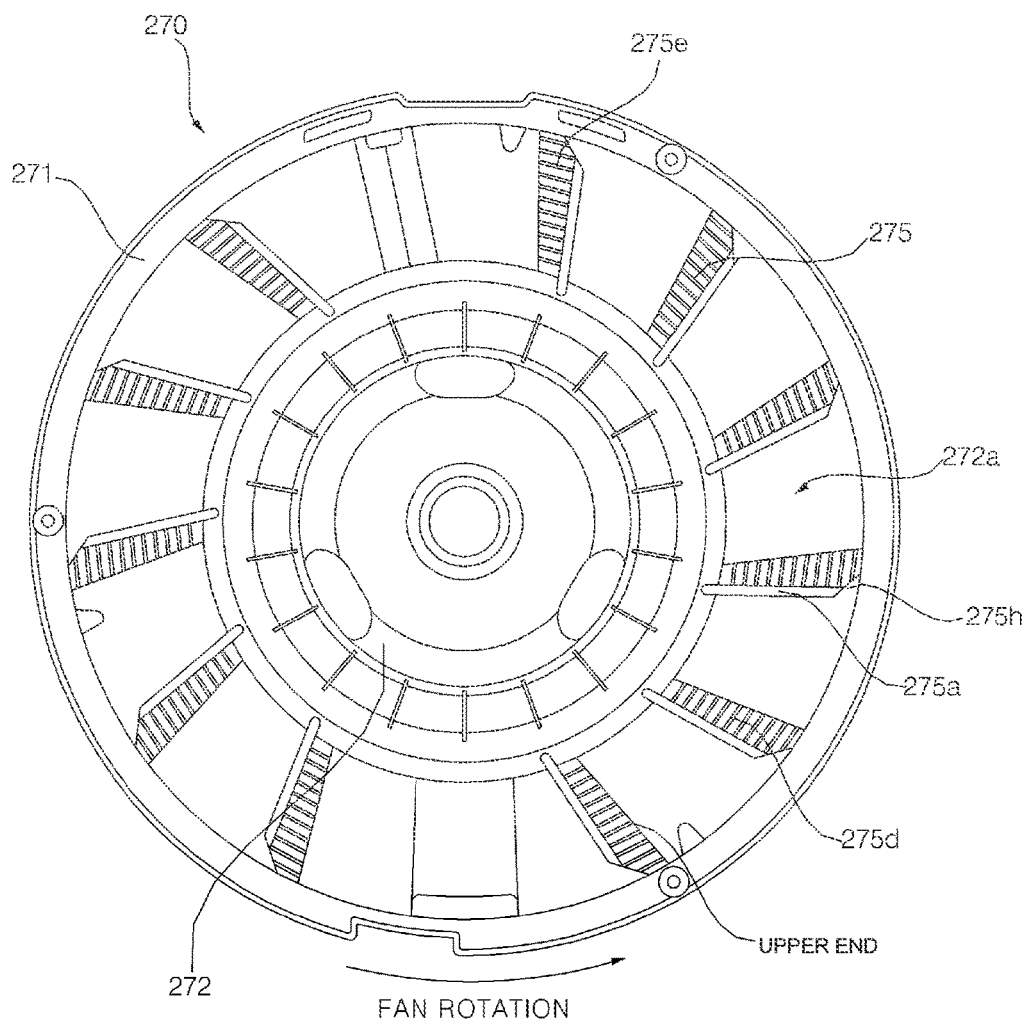
FIG. 25 is a bottom view of the air guide unit shown in FIG. 23.
Figure 26:
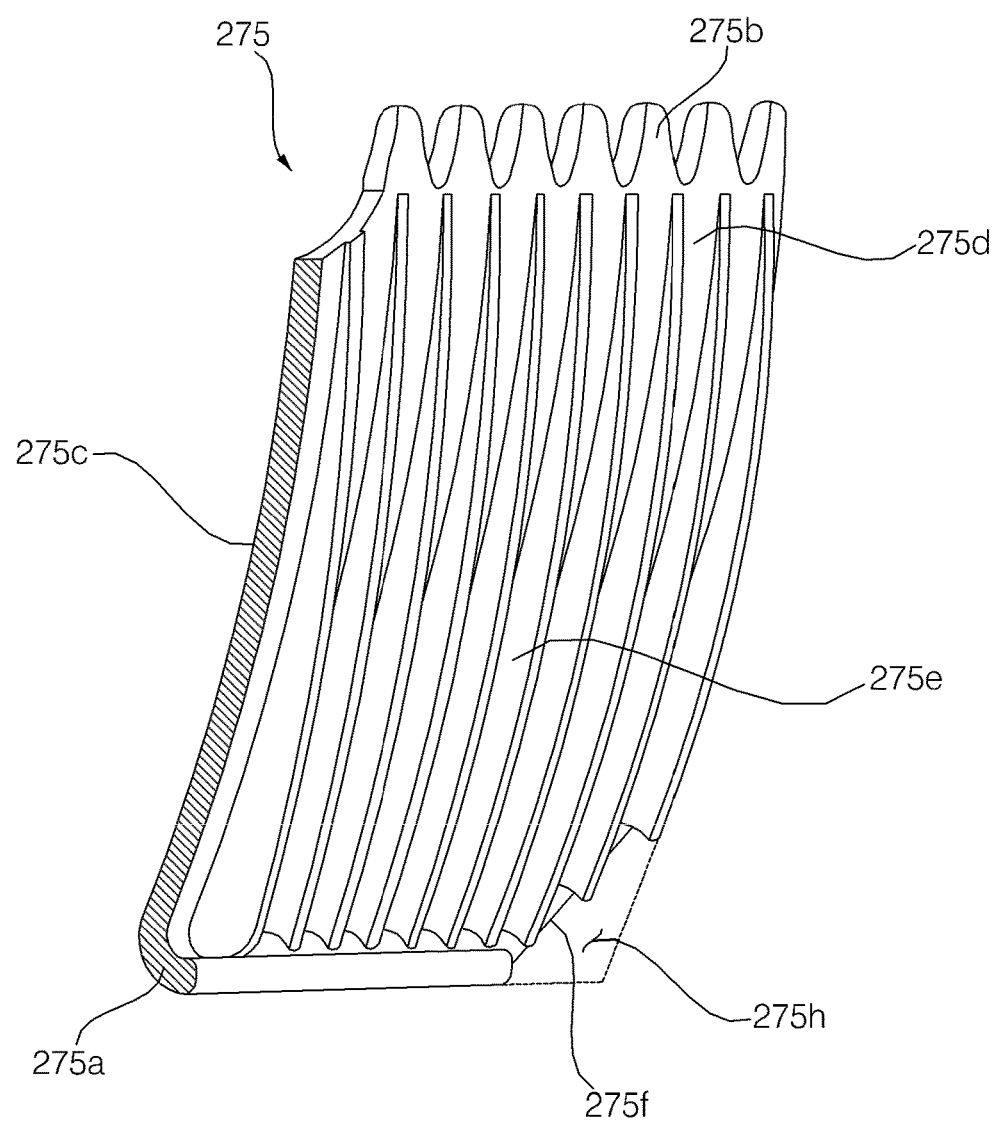
FIG. 26 is a perspective view of an example guide rib of the air guide unit shown in FIG. 23.
Figure 27:
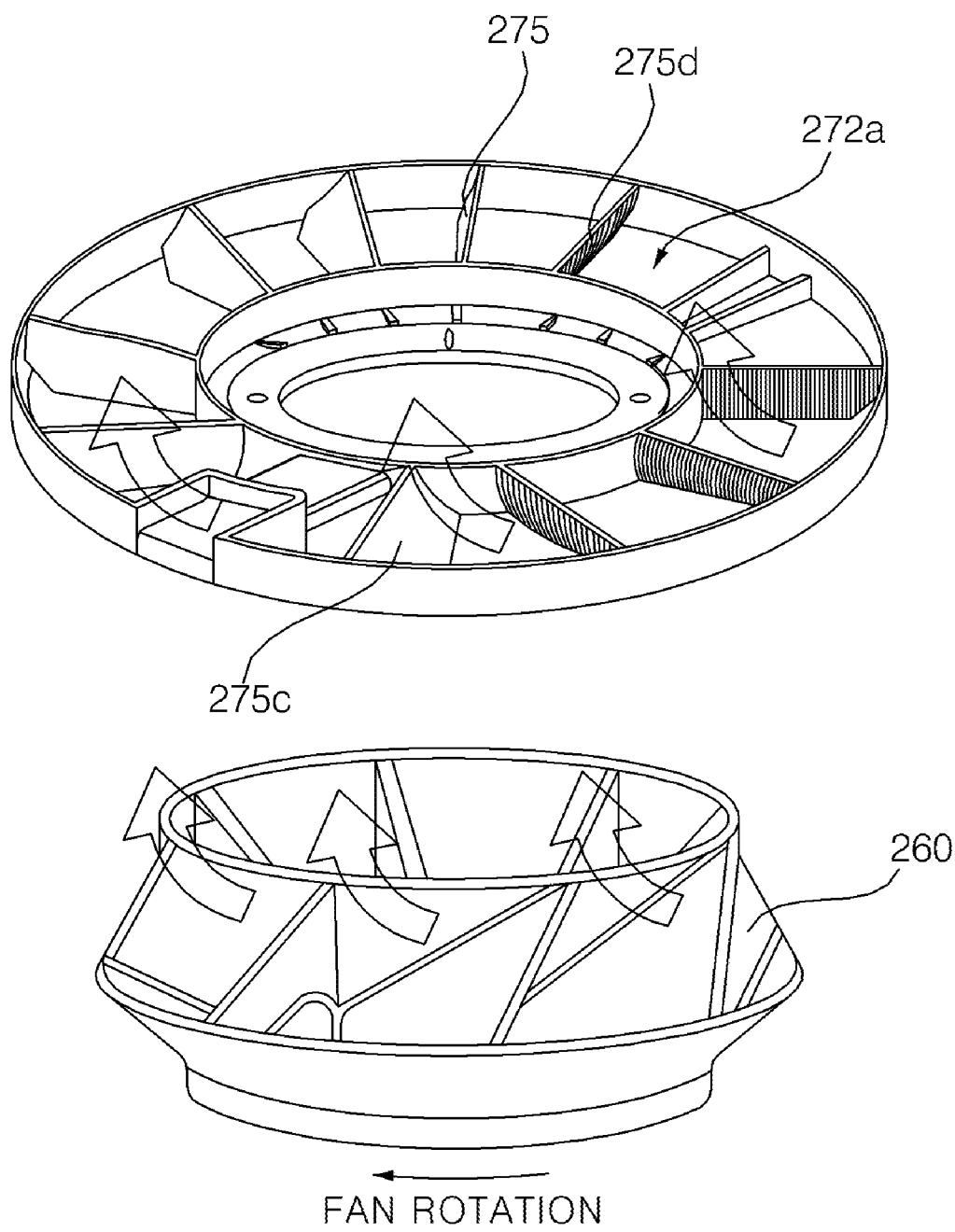
FIG. 27 is a view of the operation of the guide rib shown in FIG. 26.

FIG. 23 is a perspective cross-sectional view of an air guide unit of an air cleaner, FIG. 24 is a plan view of the air guide unit shown in FIG. 23, FIG. 25 is a bottom view of the air guide unit shown in FIG. 23, FIG. 26 is a perspective view of a guide rib of the air guide unit shown in FIG. 23, and FIG. 27 is a view showing the operation of the guide rib shown in FIG. 26.

Referring to FIGS. 23 to 27, the air guide unit 270 includes a cylindrical outer wall 271, and an inner wall 272 which is disposed in a central portion of the outer wall 271 and forms a space to which the fan motor 265 is inserted. The air guide unit 270 is provided with an annular air flow path 272a through which air discharged by the fan 260 flows between the inner circumferential surface of the outer wall 271 and the outer circumferential surface of the inner wall 272.

The air guide unit 270 may further include a plurality of guide ribs 275 disposed to be spaced apart from each other in the circumferential direction in the annular air flow path 272a. Each of the plurality of guide ribs 275 may connect the inner circumferential surface of the outer wall 271 and the inner circumferential surface of the inner wall 272.

The outer wall 271 may be disposed above the fan housing 250. The lower portion of the inner wall 272 may protrude to the lower side of the outer wall 271.

The plurality of guide ribs 275 are coupled to the inner circumferential surface of the outer wall 271. The outer wall 271 forms the annular air flow path 272a together with the inner wall 272.

The inner wall 272 is formed in a bowl shape and the fan motor 265 is inserted and fastened to the inner wall 272. A plurality of guide ribs 275 are coupled to the outer circumferential surface of the inner wall 272. The fan motor 265 is disposed inside the inner wall 272, and the upper portion of the fan 260 is disposed outside the inner wall 272. The inner wall 272 is spaced apart from the central portion of the outer wall 271 and forms the annular air flow path 272a together with the outer wall 271.

The plurality of guide ribs 275 are disposed to be spaced apart from the air flow path 272a in the circumferential direction. Each of the plurality of guide ribs 275 connects the inner wall 272 and the outer wall 271 to support the inner wall 272 spaced apart from the outer wall 271.

Each of the plurality of guide ribs 275 guides the air discharged from the fan 260 to the air flow path 272a upward. Each of the plurality of guide ribs 275 is formed in a curved plate shape which is disposed to be erected close to the vertical direction. Each of the plurality of guide ribs 275 is provided with a plurality of flow guide protrusions 275e formed on one surface thereof in the air flow direction.

The surface of the guide rib 275 in the direction from which air flows is referred as a positive pressure surface 275c, and the surface opposite to the positive pressure surface 275c is referred as a negative pressure surface 275d. In some implementations, the surface on which the plurality of flow guide protrusions 275e are not formed is the positive pressure surface 275c and the surface on which the plurality of flow guide protrusions 275e are formed is the negative pressure surface. In the guide rib 275, the upstream side in the air flow direction is referred to as a lower end, and the downstream side in the air flow direction is referred to as an upper end.

The air discharged from the fan 260 is discharged into the air flow path 272a to be inclined upwardly in the circumferential direction and is rotated in the rotation direction of the fan 260 when entering the air flow path 272a. In some implementations, the air discharged to the fan 260 is rotated in the clockwise direction when viewed from the upper side and flows upward.

Each of the plurality of guide ribs 275 is formed in a curved plate shape in which the positive pressure surface 275c is formed to be concave, and the negative pressure surface 275d is formed to be convex. In each of the plurality of guide ribs 275, one side coupled to the inner circumferential surface of the outer wall 271 is formed to be bent in the positive pressure surface 275c direction that is a direction in which air flows as it progresses toward the lower end while the upper end is formed toward the upper side.

Each of the plurality of guide ribs 275 is formed in such a manner that the lower end thereof faces the rotation direction of the fan 260 as it progresses toward the radial direction, and the upper end thereof faces the rotation direction of the fan 260 as it progresses toward the radial direction. Each of the plurality of guide ribs 275 rotates in a spiral shape and guides the flowed air in a vertical direction due to the above-described shape.

The plurality of flow guide protrusions 275e protrude from the negative pressure surface 275d of the guide rib 275 and the longitudinal direction is formed in the air flow direction. The plurality of flow guide protrusions 275e are formed to be spaced apart from each other in the radial direction on the negative pressure surface 275d of the guide rib 275 and formed long vertically.

Each of the plurality of flow guide protrusions 275e is formed in the form of an airfoil as the height protruding from the negative pressure surface 275e becomes lower while progressing from the lower end to the upper end. Each of the plurality of flow guide protrusions 275e is formed to be convex in the bending direction of the negative pressure surface 275d of the guide rib 275.

Each of the plurality of flow guide protrusions 275e is formed on the negative pressure surface 275d of the guide rib 275, thereby suppressing the generation of vortex on the negative pressure surface 275d of the guide rib 275, guiding air to flow upward, and increasing the amount of air flowing upwards.

A bending portion 275a bent toward the negative pressure surface 275d is formed in a lower end of each of the plurality of guide ribs 275. The bending portion 275a is bent round in the height direction of the plurality of flow guide protrusions 275e so that air flowing into the positive pressure surface 275c flows upward through the positive pressure surface 275c, and air flowing into the negative pressure surface 275d is guided to the plurality of guide ribs 275.

A plurality of teeth portions 275b spaced apart from each other in a radial direction is formed in the upper end of each of the plurality of guide ribs 275. Each of the plurality of teeth portions 275b has a convex upper end. Each of the plurality of teeth portions 275b may have a rounded upper protrusion. Each of the plurality of teeth portions 275b is formed to have a width in the radial direction that becomes wider as it progresses from the upper end to the lower end. A plurality of teeth portions 275b are formed in the upper end of the guide rib 275, so that time difference occurs in the air passing through the plurality of teeth portions 275b to suppress noise.

Each of the plurality of guide ribs 275 is provided with a cutoff portion 275f connecting the lower end of the guide rib 275 and one side of the guide rib 275 close to the outer wall 271. The cutoff portion 275f forms a cutoff hole 275h, between the cutoff portion 275f and the inner circumferential surface of the outer wall 271, that communicates in the rotation direction of the fan 260.

Since the air flowing inclinedly from the fan 260 passes through the cutoff hole 275h near the inner circumferential surface of the outer wall 271, the noise generated by the wind may be reduced.

Referring to FIG. 26, the cutoff portion 275f may be formed as an inclined portion inclined closer to the outer wall 271 as it progresses from the lower end to the upper end. Therefore, the cutoff portion 275f may form a triangular cutoff hole 275h between the cutoff portion 275f and the inner circumferential surface of the outer wall 271.

Figure 28:
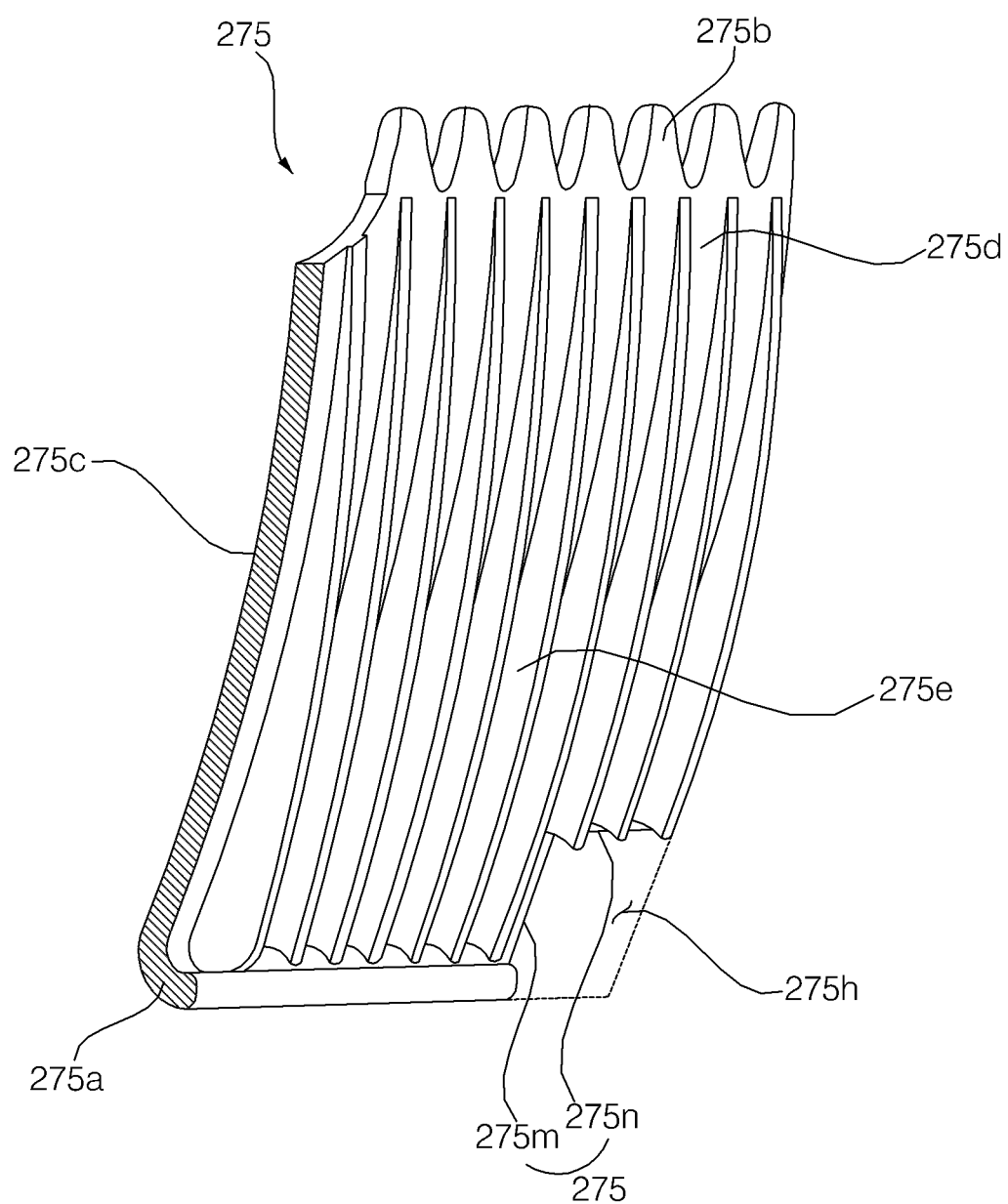
FIG. 28 is a perspective view of an example guide rib.

FIG. 28 is a perspective view of an example guide rib shown in FIG. 26. Here, the same reference numerals are given to the same configurations of the guide rib 275 shown in FIG. 26, detailed description thereof will be omitted, and only different points will be described.

Referring to FIG. 28, the cutoff portion 275f may include a vertical portion 275m extended vertically from the lower end, and a horizontal portion 275n extended in the radial direction from the upper end of the vertical portion 275m to one side of the guide rib 275 that is close to the outer wall 271. Therefore, the cutoff portion 275f may form a rectangular cutoff hole 275h between the cutoff portion 275f and the inner circumferential surface of the outer wall 271.

As described above, in the air cleaner, the plurality of flow guide protrusions 275e are formed, on the negative pressure surface 275d of each of the plurality of guide ribs 275, spaced apart from each other in the radial direction and are formed vertically long, thereby maximizing the air volume moving upwards.

In addition, the cutoff portion 275f is formed in one side of each of the plurality of guide ribs 275, and the cutoff portion 275f forms a cutoff hole 275h communicating in the rotation direction of the fan 260, between the cutoff portion 275f and the inner circumferential surface of the outer wall 271. Therefore, the noise caused by wind can be reduced.

What is claimed is:

1. An air cleaner comprising:
   a fan that is configured to suction air in an axial direction and discharge air between the axial direction and a radial direction;
   a fan motor that is configured to rotate the fan; and
   an air guide unit that:
     includes (i) a cylindrical outer wall and (ii) an inner wall that is located in a center portion of the outer wall and that defines a space that is configured to receive the fan motor;
     defines an annular air flow path that is configured to receive air discharged by the fan and that is defined by an inner circumferential surface of the outer wall and an outer circumferential surface of the inner wall;
     includes a plurality of guide ribs that are spaced apart from each other in a circumferential direction, that are located in the annular air flow path, that each have a curved plate shape that includes a positive pressure surface that pushes air and is concave and a negative pressure surface that is opposite the positive pressure surface and that is convex, and that each include a cutoff portion that connects a lower end of a respective guide rib to a side of the respective guide rib close to the outer wall; and includes a plurality of flow guide protrusions that are spaced apart from each other in the radial direction, that protrude from the negative pressure surface, and that extend vertically, wherein each cutoff portion defines a cut-off hole that joins the cutoff portion and the inner circumferential surface of the outer wall in a rotation direction.

2. The air cleaner of claim 1, wherein each of the plurality of flow guide protrusions has a protruded height from the negative pressure surface that decreases from a lower end of the flow guide protrusion to an upper end of the flow guide protrusion.

3. The air cleaner of claim 2, wherein each of the plurality of guide ribs has an upper end and a lower end that are oriented in the rotation direction of the fan as the upper end and the lower end progress in the radial direction.

4. The air cleaner of claim 1, wherein the cutoff portion is inclined closer to the outer wall as it progresses from a lower end to an upper end.

5. The air cleaner of claim 1, wherein the cutoff portion comprises:
   a vertical portion that extends vertically from a lower end; and
   a horizontal portion that extends in the radial direction from an upper end of the vertical portion to one side of the guide rib close to the outer wall.

6. The air cleaner of claim 1, wherein each of the plurality of guide ribs includes a plurality of teeth that are located in an upper end of a respective guide rib and that are spaced apart from each other in the radial direction, wherein each of the plurality of teeth has an upper end that is convex, and has a width in the radial direction that becomes wider as it progresses from the upper end to a lower end.

7. The air cleaner of claim 1, wherein each of the plurality of guide ribs includes a bending portion that is located at a lower end of a respective guide rib and that is bent toward the negative pressure surface.

8. The air cleaner of claim 1, wherein each of the plurality of guide ribs connects the inner circumferential surface of the outer wall and the outer circumferential surface of the inner wall.

9. The air cleaner of claim 1, wherein the fan comprises:
   a hub that is coupled to a rotation shaft of the fan motor and that extends with a radius that increases in a direction of air flow through the annular air flow path;
   a shroud that is spaced apart from the hub, that extends in a direction in which the hub extends, and that includes a central portion that defines a suction port that is configured to suck air; and
   a plurality of blades that are located between the hub and the shroud.

10. The air cleaner of claim 9, comprising a fan housing that is configured to receive the fan,
   wherein the outer wall is located above the fan housing, and
   wherein a lower portion of the inner wall is located in an opened upper side of the hub.

11. The air cleaner of claim 1, wherein the plurality of flow guide protrusions extend vertically from an upstream side to a downstream side in an air flow direction.

* * * * *